US012701380B2

(12) United States Patent
Wu et al.

(10) Patent No.: US 12,701,380 B2
(45) Date of Patent: Aug. 4, 2026

(54) APPARATUS, METHOD AND COMPUTER PROGRAM FOR SYNTHESIZING A SPATIALLY EXTENDED SOUND SOURCE USING ELEMENTARY SPATIAL SECTORS

(71) Applicant: Fraunhofer-Gesellschaft zur Förderung der angewandten Forschung e.V., Munich (DE)

(72) Inventors: Yun-Han Wu, Erlangen (DE); Jürgen Herre, Erlangen (DE); Mikhail Korotiaev, Erlangen (DE); Matthias Geier, Erlangen (DE); Simon Schwär, Erlangen (DE); Alexander Adami, Erlangen (DE); Carlotta Anemüller, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 149 days.

(21) Appl. No.: 18/637,801

(22) Filed: Apr. 17, 2024

(65) Prior Publication Data

US 2024/0267696 A1 Aug. 8, 2024

Related U.S. Application Data

(63) Continuation of application No. PCT/EP2022/080996, filed on Nov. 7, 2022.

(30) Foreign Application Priority Data

Nov. 9, 2021 (EP) .................................... 21207288

(51) Int. Cl.
*H04S 7/00* (2006.01)

(52) U.S. Cl.
CPC .............. *H04S 7/303* (2013.01); *H04S 7/307* (2013.01); *H04S 2400/11* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 8,126,152 | B2 | 2/2012 | Taleb |
| 10,425,762 | B1 | 9/2019 | Schissler |

(Continued)

FOREIGN PATENT DOCUMENTS

| | | | |
|---|---|---|---|
| CN | 111713121 | A | 9/2020 |
| EP | 3879856 | A1 | 9/2021 |

(Continued)

OTHER PUBLICATIONS

Russian Office Action dated Nov. 13, 2024 issued in Russian patent application No. 2024115700.

(Continued)

*Primary Examiner* — Qin Zhu
(74) *Attorney, Agent, or Firm* — McClure, Qualey & Rodack, LLP

(57) ABSTRACT

An apparatus for synthesizing a spatially extended sound source (SESS), has: a storage for storing rendering data items for different elementary spatial sectors covering a rendering range for a listener; a sector identification processor for identifying, from the different elementary spatial sectors, a set of elementary spatial sectors belonging to the spatially extended sound source based on listener data and spatially extended sound source data; a target data calculator for calculating target rendering data from the rendering data items for the set of elementary spatial sectors; and an audio processor for processing an audio signal representing the (Continued)

(FIRST ASPECT)

spatially extended sound source using the target rendering data.

15 Claims, 10 Drawing Sheets

(56) References Cited

U.S. PATENT DOCUMENTS

| | | | | |
|---|---|---|---|---|
| 2008/0037796 | A1 | 2/2008 | Jot | |
| 2011/0038489 | A1 | 2/2011 | Visser | |
| 2011/0211702 | A1 | 9/2011 | Mundt et al. | |
| 2012/0057710 | A1 | 3/2012 | Disch | |
| 2012/0206452 | A1 | 8/2012 | Geisner | |
| 2016/0073215 | A1 | 3/2016 | De Bruijn | |
| 2020/0296533 | A1 | 9/2020 | Thall | |
| 2021/0004201 | A1 | 1/2021 | Munoz | |
| 2021/0084429 | A1* | 3/2021 | Tajik | G02B 27/0172 |
| 2021/0266693 | A1 | 8/2021 | Raghuvanshi | |
| 2021/0289309 | A1* | 9/2021 | Herre | H04S 7/303 |
| 2022/0210596 | A1* | 6/2022 | Yoo | H04S 7/303 |

FOREIGN PATENT DOCUMENTS

| | | | |
|---|---|---|---|
| JP | 2016146642 | A | 8/2016 |
| JP | 2017175356 | A | 9/2017 |
| JP | 2021525392 | A | 9/2021 |
| RU | 2505941 | C2 | 1/2014 |
| RU | 2523215 | C2 | 7/2014 |
| RU | 2671627 | C2 | 11/2018 |
| TW | 201032220 | A | 9/2010 |
| TW | 202110198 | A | 3/2021 |
| WO | 2013155217 | A1 | 10/2013 |
| WO | 2020127329 | A1 | 6/2020 |
| WO | 2021144308 | A1 | 7/2021 |
| WO | 2021180935 | A1 | 9/2021 |

OTHER PUBLICATIONS

Japanese language office action dated Jul. 4, 2025, issued in application No. JP 2024-527157 (English language translation, pp. 7-16 of attachment).

International Search Report and Written Opinion issued in application No. PCT/EP2022/080996.

Lauridsen, H., "Experiments Concerning Different Kinds of Room-Acoustics Recording;" Ingenioren; 47; 1954; pp. 906-910.

English language translation of abstract of "Experiments Concerning Different Kinds of Room-Acoustics Recording" (p. 910 of publication).

Kendall, G.S.; "The Decorrelation of Audio Signals and Its Impact on Spatial Imagery;" Computer Music Journal, 19(4); 1995; pp. 71-87.

Baumgarte, F., et al.; "Binaural Cue Coding—Part I: Psychoacoustic Fundamentals and Design Principles", Speech and Audio Processing; IEEE Transactions on Speech and Audio Processing; 11(6); 2003; pp. 509-519.

Faller, C., et al.; "Binaural Cue Coding—Part II: Schemes and Applications;"IEEE Transactions on Speech and Audio Processing; 11(6); pp. 520-531.

Alary, B., et al.; "Velvet Noise Decorrelator;" Proceedings of the 20th International Conference on Digital Audio Effects (DAFx-17); Sep. 2017; pp. 405-411.

Schlecht, S.J., et al.; "Optimized Velvet-Noise Decorrelator;" Proceedings of the 21th International Conference on Digital Audio Effects (DAFx-18); Sep. 2018; pp. 87-94.

Pihlajamaki. T, et al.; "Synthesis of Spatially Extended Virtual Source with Time-Frequency Decomposition of Mono Signals;" Journal of the Audio Engineering Society; 201; pp. 467-484.

Veron, C., et al.; "A 3-D Immersive Synthesizer for Environmental Sounds", Audio, Speech, and Language Processing; IEEE Transactions on Audio, Speech, and Language Processing; vol. 18; No. 6; Aug. 2010, pp. 1550-1561.

Potard, G., et al.; "A study on sound source apparent shape and wideness;" Proceedings of the 2003 International Conference on Auditory Display; Jul. 2003; pp. 25-28.

Potard, G., et al.; "Decorrelation Techniques for the Rendering of Apparent Sound Source Width in 3D Audio Displays;" Proc. of the 7th Int. Conference on Digital Audio Effects (DAFx'04); Oct. 2004; pp. 280-284.

Schmidt, J., et al.; New and Advanced Features for Audio Presentation in the MPEG-4 Standard;: Audio Engineering Society Convention Paper 6058; May 2004; pp. 1-13.

Schmele, T., et al.; "Controlling the Apparent Source Size in Ambisonics Using Decorrelation Filters;" Audio Engineering Society Conference Paper; Aug. 2018; pp. 1-7.

Zotter, F., et al.; "Efficient Phantom Source Widening;" Archives of Acoustics, 38(1); 2013; pp. 27-37.

Zotter, F., et al.; "Efficient Phantom Source Widening and Diffuseness in Ambisonics;" Proc. of the EAA Joint Symposium on Auralization and Ambisonics; Apr. 2014; pp. 69-74.

Pulkki, V.; "Virtual Sound Source Positioning Using Vector Base Amplitude Panning;" Journal of the Audio Engineering Society; Jun. 1997; pp. 456-466.

Pulkki, V.; "Uniform spreading of amplitude panned virtual sources;" Proc. 1999 IEEE Workshop on Applications of Signal Processing to Audio and Acoustics; Oct. 1999; pp. W99-1 thru W99-4.

Pulkki, V.; "Spatial Sound Reproduction with Directional Audio Coding;"J. Audio Eng. Soc; vol. 55; No. 6; Jun. 2007; pp. 503-516.

Pulkki, V.; "Efficient Spatial Sound Synthesis for Virtual Worlds;" AES 35th International Conference Feb. 2009; pp. 1-10.

Japanese language office action dated Apr. 14-87, 2025 issued in application No. JP 2024-527156 (english language translation included, pp. 4-8 of attachment).

Russian language office action dated Nov. 18, 2024 issued in application No. RU 2024115701.

English language translation of office action dated Nov. 18, 2024.

Notice of Allowance dated May 5, 2026, issued in U.S. Appl. No. 18/651,270.

* cited by examiner (FIRST ASPECT)

(SECOND ASPECT)

(SECOND ASPECT)

(THIRD ASPECT)

APPARATUS, METHOD AND COMPUTER PROGRAM FOR SYNTHESIZING A SPATIALLY EXTENDED SOUND SOURCE USING ELEMENTARY SPATIAL SECTORS

CROSS-REFERENCE TO RELATED APPLICATIONS

This application is a continuation of copending International Application No. PCT/EP2022/080996, filed Nov. 7, 2022, which is incorporated herein by reference in its entirety, and additionally claims priority from European Application No. 21207288.8, filed Nov. 9, 2021, which is also incorporated herein by reference in its entirety.

TECHNICAL FIELD

The present invention relates audio signal processing, and is particularly related to the synthesis of Spatially Extended Sound Sources (SESS).

BACKGROUND OF THE INVENTION

The reproduction of sound sources over several loudspeakers or headphones has been long investigated. The simplest way of reproducing sound sources over such setups is to render them as point sources, i.e., very (ideally: infinitely) small sound sources. This theoretic concept, however, is hardly able to model existing physical sound sources in a realistic way. For instance, a grand piano has a large vibrating wooden closure with many spatially distributed strings inside and thus appears much larger in auditory perception than a point source (especially when the listener (and the microphones) are close to the grand piano. Many real-world sound sources have a considerable size ("spatial extent") like musical instruments, machines, an orchestra or choir or ambient sounds (sound of a waterfall).

Correct/realistic reproduction of such sound sources has become the target of many sound reproduction methods, be it binaural (i.e., using so-called Head-Related Transfer Functions HRTFs or Binaural Room Impulse Responses BRIRs) using headphones or conventionally using loudspeaker setups ranging from 2 speakers ("stereo") to many speakers arranged in a horizontal plane ("Surround Sound") and many speakers surrounding the listener in all three dimensions ("3D Audio").

As an example, if a SESS (e.g. a fountain) is listened to from a place where part of the fountain is occluded by bushes, the occluded parts of the fountain are subject to a frequency damping process, i.e. are attenuated by a certain frequency response that is determined by the transmission characteristics of the bush. The capability of rendering such (partially) occluded SESS parts is not available in the originally described SESS rendering algorithm. Similarly, more distant parts of the SESS may be rendered realistically with lower level using the present invention.

2D Source Width

This section describes methods that pertain to rendering extended sound sources on a 2D surface faced from the point of view of a listener, e.g., in a certain azimuth range at zero degrees of elevation (like is the case in conventional stereo/surround sound) or certain ranges of azimuth and elevation (like is the case in 3D Audio or virtual reality with 3 degrees of freedom ["3DoF" ] of the user movement, i.e., head rotation in pitch/yaw/roll axes).

Increasing the apparent width of an audio object which is panned between two or more loudspeakers (generating a so-called phantom image or phantom source) can be achieved by decreasing the correlation of the participating channel signals (Blauert, 2001, S. 241-257). With decreasing correlation, the phantom source's spread increases until, for correlation values close to zero (and not too wide opening angles), it covers the whole range between the loudspeakers.

Decorrelated versions of a source signal are obtained by deriving and applying suitable decorrelation filters. Lauridsen (Lauridsen, 1954) proposed to add/subtract a time delayed and scaled version of the source signal to itself in order to obtain two decorrelated versions of the signal. More complex approaches were for example proposed by Kendall (Kendall, 1995). He iteratively derived paired decorrelation all-pass filters based on combinations of random number sequences. Faller et al. propose suitable decorrelation filters ("diffusers") in (Baumgarte & Faller, 2003) (Faller & Baumgarte, 2003). Also, Zotter et al. derived filter pairs in which frequency-dependent phase or amplitude differences were used to achieve widening of a phantom source (Zotter & Frank, 2013). Furthermore, (Alary, Politis, & Välimäki, 2017) proposed decorrelation filters based on velvet noise which were further optimized by (Schlecht, Alary, Välimäki, & Habets, 2018).

Besides reducing correlation of the phantom source's corresponding channel signals, source width can also be increased by increasing the number of phantom sources attributed to an audio object. In (Pulkki, 1999), the source width is controlled by panning the same source signal to (slightly) different directions. The method was originally proposed to stabilize the perceived phantom source spread of VBAP-panned (Pulkki, 1997) source signals when they are moved in the sound scene. This is advantageous since dependent on a source's direction, a rendered source is reproduced by two or more speakers which can result in undesired alterations of perceived source width.

Virtual world DirAC (Pulkki, Laitinen, & Erkut, 2009) is an extension of the traditional Directional Audio Coding (DirAC) (Pulkki, 2007) approach for sound synthesis in virtual worlds. For rendering spatial extent, directional sound components of a source are randomly panned within a certain range around the source's original direction, where panning directions vary with time and frequency.

A similar approach is pursued in (Pihlajamäki, Santala, & Pulkki, 2014), where spatial extent is achieved by randomly distributing frequency bands of a source signal into different spatial directions. This is a method aiming at producing a spatially distributed and enveloping sound coming equally from all directions rather than controlling an exact degree of extent.

Verron et al. achieved spatial extent of a source by not using panned correlated signals, but by synthesizing multiple incoherent versions of the source signal, distributing them uniformly on a circle around the listener, and mixing between them (Verron, Aramaki, Kronland-Martinet, & Pallone, 2010). The number and gain of simultaneously active sources determine the intensity of the widening effect. This method was implemented as a spatial extension to a synthesizer for environmental sounds.

3D Source Width

This section describes methods that pertain to rendering extended sound sources in 3D space, i.e. in a volumetric way as it is used for virtual reality with 6 degrees of freedom ("6DoF"). This means 6 degrees of freedom of the user movement, i.e. head rotation in pitch/yaw/roll axes) plus 3 translational movement directions x/y/z.

Potard et al. extended the notion of source extent as a one-dimensional parameter of the source (i.e., its width between two loudspeakers) by studying the perception of source shapes (Potard, 2003). They generated multiple incoherent point sources by applying (time-varying) decorrelation techniques to the original source signal and then placing the incoherent sources to different spatial locations and by this giving them three-dimensional extent (Potard & Burnett, 2004).

In MPEG-4 Advanced AudioBIFS (Schmidt & Schröder, 2004), volumetric objects/shapes (shuck, box, ellipsoid and cylinder) can be filled with several equally distributed and decorrelated sound sources to evoke three-dimensional source extent.

In order to increase and control source extent using Ambisonics, Schmele at al. (Schmele & Sayin, 2018) proposed a mixture of reducing the Ambisonics order of an input signal, which inherently increases the apparent source width, and distributing decorrelated copies of the source signal around the listening space.

Another approach was introduced by Zotter et al., where they adopted the principle proposed in (Zotter & Frank, 2013) (i.e., deriving filter pairs that introduce frequency-dependent phase and magnitude differences to achieve source extent in stereo reproduction setups) for Ambisonics (Zotter F., Frank, Kronlachner, & Choi, 2014).

A common disadvantage of panning-based approaches (e.g., (Pulkki, 1997) (Pulkki, 1999) (Pulkki, 2007) (Pulkki, Laitinen, & Erkut, 2009)) is their dependency on the listener's position. Even a small deviation from the sweet spot causes the spatial image to collapse into the loudspeaker closest to the listener. This drastically limits their application in the context of virtual reality and augmented reality with 6 degrees-of-freedom (6DoF) where the listener is supposed to freely move around. Additionally, distributing time-frequency bins in DirAC-based approaches (e.g., (Pulkki, 2007) (Pulkki, Laitinen, & Erkut, 2009)) not always guarantees the proper rendering of the spatial extent of phantom sources. Moreover, it typically significantly degrades the source signal's timbre.

Decorrelation of source signals is usually achieved by one of the following methods: i) deriving filter pairs with complementary magnitude (e.g. (Lauridsen, 1954)), ii) using all-pass filters with constant magnitude but (randomly) scrambled phase (e.g., (Kendall, 1995) (Potard & Burnett, 2004)), or iii) spatially randomly distributing time-frequency bins of the source signal (e.g., (PihlajamAki, Santala, & Pulkki, 2014)).

All approaches come with their own implications: Complementary filtering a source signal according to i) typically leads to an altered perceived timbre of the decorrelated signals. While all-pass filtering as in ii) preserves the source signal's timbre, the scrambled phase disrupts the original phase relations and especially for transient signals causes severe temporal dispersion and smearing artifacts. Spatially distributing time-frequency bins proved to be effective for some signals, but also alters the signal's perceived timbre. Furthermore, it showed to be highly signal dependent and introduces severe artifacts for impulsive signals.

Populating volumetric shapes with multiple decorrelated versions of a source signal as proposed in Advanced AudioBIFS ((Schmidt & Schroder, 2004) (Potard, 2003) (Potard & Burnett, 2004)) assumes availability of a large number of filters that produce mutually decorrelated output signals (typically, more than ten point sources per volumetric shape are used). However, finding such filters is not a trivial task and becomes more difficult the more such filters are needed. Furthermore, if the source signals are not fully decorrelated and a listener moves around such a shape, e.g., in a (virtual reality) scenario, the individual source distances to the listener correspond to different delays of the source signals and their superposition at the listener's ears result in position dependent comb-filtering potentially introducing annoying unsteady coloration of the source signal.

Controlling source width with the Ambisonics-based technique in (Schmele & Sayin, 2018) by lowering Ambisonics order showed to have an audible effect only for transitions from 2nd to 1st or to 0th order. Furthermore, these transitions are not only perceived as a source widening but also frequently as a movement of the phantom source. While adding decorrelated versions of the source signal could help stabilizing the perception of apparent source width, it also introduces comb-filter effects that alter the phantom source's timbre.

An efficient method for binaural rendering a spatially extended sound source (SESS) was disclosed in WO2021/180935 using two decorrelated versions of an input waveform signal (this may be produced by using an original mono signal and a decorrelator to produce a decorrelated version of this mono signal), a cue calculation stage that calculates the target binaural (and timbral) cues of the spatially extended sound source depending on the size of the source (e.g. given as an azimuth-elevation angle range depending on the position and orientation of the spatially extended sound source and the listener). In an embodiment, this cue calculation stage pre-calculates the target cues depending on the spatial regions to be covered by the SESS and stores them into a lookup table, and a binaural cue adjustment stage that produces the binaurally rendered output signal from the input signal and its decorrelated version using the target cues forms the cue calculation stage (lookup table). The binaural adjustment stage adjusts the binaural cues (Inter-channel Coherence ICC, Inter-channel Phase Difference ICPD, Inter-channel Level Difference ICLD) of the input signals in several steps to their desired target value, as calculated by the cue calculation stage/lookup table.

SUMMARY

According to an embodiment, an apparatus for synthesizing a spatially extended sound source (SESS) may have: a storage for storing rendering data items for different elementary spatial sectors covering a rendering range for a listener; a sector identification processor for identifying, from the different elementary spatial sectors, a set of elementary spatial sectors belonging to the spatially extended sound source based on listener data and spatially extended sound source data, wherein the set of elementary spatial sectors has two or more elementary spatial sectors from the different elementary spatial sectors; a target data calculator for calculating target rendering data using a combination of the rendering data items for the set of elementary spatial sectors; and an audio processor for processing an audio signal representing the spatially extended sound source using the target rendering data.

According to another embodiment, a method of synthesizing a spatially extended sound source (SESS) may have the steps of: storing rendering data items for different elementary spatial sectors covering a rendering range for a listener; identifying, from the different elementary spatial sectors, a set of elementary spatial sectors belonging to the spatially extended sound source based on listener data and spatially extended sound source data, wherein the set of elementary spatial sectors has two or more elementary spatial sectors from the different elementary spatial sectors; calculating target rendering data using a combination of the rendering data items for the set of elementary spatial sectors; and processing an audio signal representing the spatially extended sound source using the target rendering data.

Another embodiment may have a non-transitory digital storage medium having a computer program stored thereon to perform a method for synthesizing a spatially extended sound source (SESS), having the steps of: storing rendering data items for different elementary spatial sectors covering a rendering range for a listener; identifying, from the different elementary spatial sectors, a set of elementary spatial sectors belonging to the spatially extended sound source based on listener data and spatially extended sound source data, wherein the set of elementary spatial sectors has two or more elementary spatial sectors from the different elementary spatial sectors; calculating target rendering data using a combination of the rendering data items for the set of elementary spatial sectors; and processing an audio signal representing the spatially extended sound source using the target rendering data, when the computer program is run by a computer.

The regular Spatially Extended Sound Sources (SESS) fast synthesis algorithm simulates the sound impression of a diffuse field in certain specified target spatial regions. This is achieved by (virtual) summation of many closely spaced sound sources that are driven by uncorrelated versions of the audio signal. Sometimes, a part of the SESS is occluded by partially transmissive material (e.g. bushes), leading to a frequency-selective attenuation of the SESS in the occluded spatial region. This effect can be elegantly and efficiently incorporated into the efficient SESS algorithm by introducing a weighting step into the calculation between the table look-up operation and the further calculation of desired binaural cues. The lookup table stores pre-calculated partial sums of terms for each spatial sector around the listener. The extension comes at virtually no additional computational cost. Embodiments are related to an apparatus and method or computer program for reproducing or synthesizing a Spatially Extended Sound Source (SESS) with selective spatial weighting.

It is an advantage of the present invention that the present invention allows the processing of a spatially extended sound source with a possibly complex geometric shape.

It is a further advantage of the present invention that embodiments allow an improved concept of reproducing a spatially extended sound source and enable possibilities for spatially selective modification of the SESS rendering.

A first aspect relates to the usage of elementary spatial sectors. This first aspect relates to the storing of data for elementary spatial sectors in the look-up table, where the elementary spatial sectors are distributed over the sphere. The data for the elementary spatial sectors are advantageously tied to the user head forming a user-centric audio scene and are the same for each inclination of the head at the same position and also for each position of the listener head, i.e., for each degree of freedom of the 6-DOF. However, each movement or inclination of the head results in a situation that the sound from the SESS "enters" at another one or more elementary spatial sectors into the user head. The renderer determines the elementary spatial sectors covered by the SESS, retrieves the stored data for these specific sectors, optionally performs a weighting of the stored data due to occluding objects or certain distances, and then combines the stored data (or in case of weighting the weighted stored data), and, then uses the result of the combination operation for rendering (e.g. rendering cues are calculated from combined (co)-variance data, but other steps and parameters can be used here as well. Hence, this aspect may or may not use a reference to occluding objects and may or may not use a reference to the specific stored variance data, since the combination (and optionally also the weighting) can also be done when other data are stored such as the (mean) HRTFs (for an elementary spatial sector or for a whole spatial extent) or even the frequency dependent cues themselves.

A second aspect relates to modifying objects that can be occluding objects or other objects resulting in a modification of the sound of the SESS on its way from the SESS position to the user having a certain location and/or inclination. This second aspect relates to the treatment of e.g. occluding objects. The influence of the occluding object is a frequency-dependent attenuation having a low-pass characteristic. The frequency dependent weighting can also be applied to the known procedure, where one does not have any elementary spatial sectors. Based on transmitted data describing occluding objects, one would have to decide, whether a SESS is occluded or not and then apply the occluding function to the e.g. frequency dependent stored cues, that are already given for different frequencies in the known technology. Hence, this is a useful application of the occluding effect in the known technology without the usage of elementary spatial sectors or without the usage of stored variance data.

A third aspect relates to the storage of variance data and covariance data for e.g. HRTFs for different spatial extents or elementary spatial sectors. This third aspect relates to the storage, e.g. in a look-up table, of variance data and covariance data for e.g. HRTFs in a storage position. It is not relevant, whether one stores this data for a certain spatial extent as in the known technology or for an elementary spatial sector. The renderer then calculates all rendering cues from the stored variance data on the fly. In contrast to the known application, where at least the IACC is stored and probably other cues or HRFT data, his is not done in this aspect. Covariance data is stored and the cues are calculated on the fly. Hence, this aspect may or may not use the elementary spatial sectors and may or may not use any modifying or occluding objects.

All aspects can be used separate from each other or together with each other or only arbitrarily selected two aspects can be combined as well.

BRIEF DESCRIPTION OF THE DRAWINGS

Embodiments of the present invention are subsequently described with respect to the accompanying drawings, in which.

DETAILED DESCRIPTION OF THE INVENTION

Figure 1:
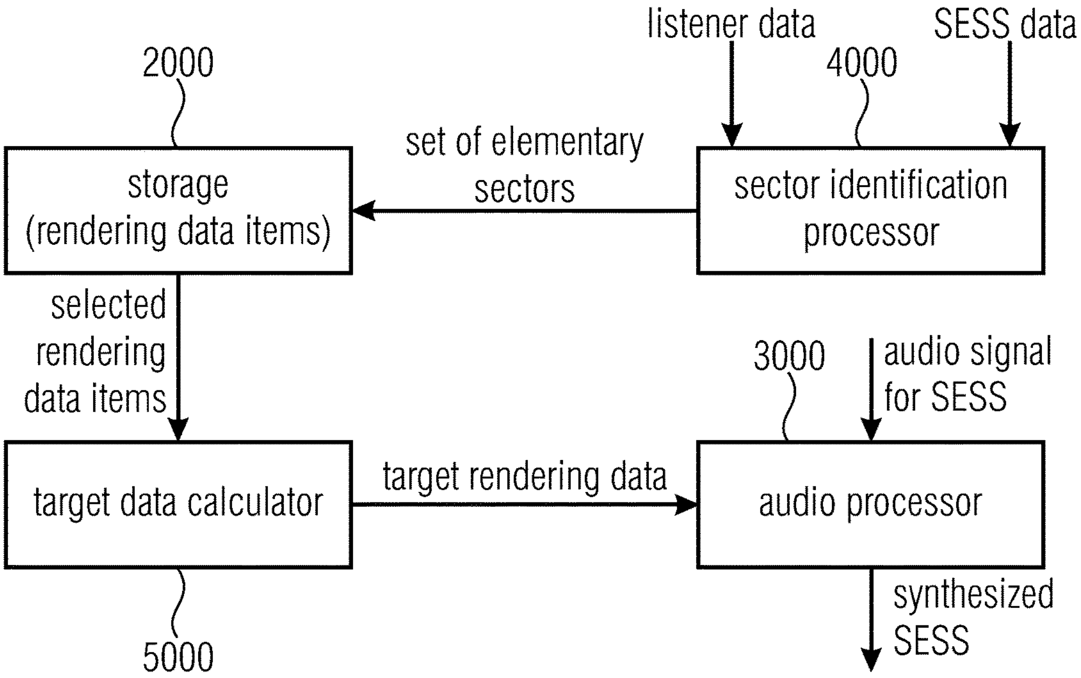
FIG. 1 illustrates an apparatus for synthesizing a spatially extended sound source in accordance with a first aspect of the present invention.

FIG. 1 illustrates an apparatus for synthesizing a spatially extended sound source. The apparatus comprises a storage 2000 for storing rendering data items for different elementary spatial sectors covering a rendering range for a listener. The apparatus furthermore comprises a sector identification processor 4000 for identifying, from the different elementary spatial sectors, a set of elementary spatial sectors belonging to the specific spatially extended sound source. The identification is performed based on listener data and data related to the spatially extended sound source (SESS). Furthermore, the apparatus comprises a target data calculator 5000 for calculating target rendering data from the rendering data items for the set of elementary spatial sectors. Additionally, the apparatus comprises an audio processor 3000 for processing the audio signal representing the spatially extended sound source using the target rendering data as generated by the target data calculator 5000.

Figure 2A:
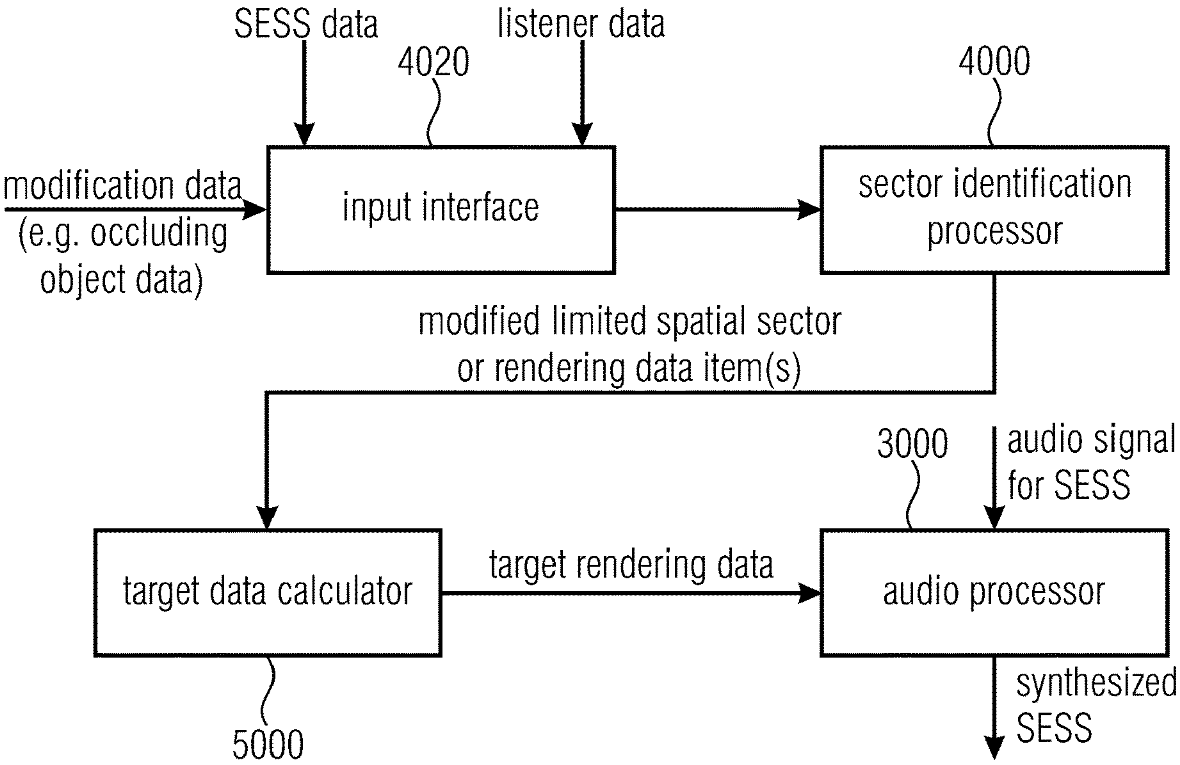
FIG. 2*a* illustrates an apparatus for synthesizing a spatially extended sound source in accordance with a second aspect of the invention.

FIG. 2*a* illustrates an apparatus for synthesizing a spatially extended sound source (SESS) comprising an input interface 4020 for receiving a description of an audio scene, the description of the audio scene comprising spatially extended sound source data on the spatially extended sound source and modification data on a potentially modifying object. Furthermore, the input interface 4020 is configured for receiving a listener data.

A sector identification processor 4000 that can, in general, be implemented as the sector identification processor 4000 of FIG. 1 is configured for identifying a limited modified spatial sector for the spatially extended sound source within a rendering range for the listener, wherein the rendering range for the listener is larger than the limited modified spatial sector. The identification is performed based on the spatially extended sound source data and the listener data and the modification data. Furthermore, the apparatus comprises a target data calculator 5000 that can, in general be, identically implemented or similarly implemented as the target data calculator 5000 of FIG. 1. This device is configured for calculating target rendering data from one or more rendering data items belonging to the modified limited spatial sector as determined by block 4000 of FIG. 2*a*. Furthermore, the apparatus for synthesizing a spatially extended sound source in accordance with the second aspect illustrated in FIG. 2*a* comprises an audio processor for processing an audio signal representing the spatially extended sound source using the target rendering data influenced by the modification data, i.e., data on a modifying object such as an occluding object.

Figure 2B:
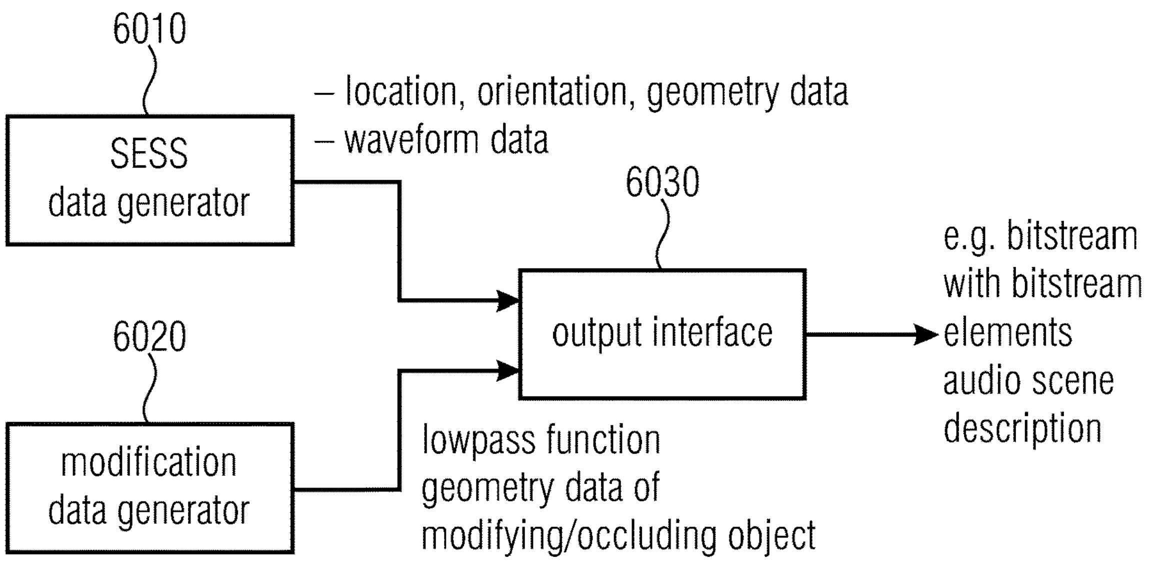
FIG. 2*b* illustrates an audio scene generator in accordance with the second aspect of the present invention.

FIG. 2*b* illustrates, again in accordance with the second aspect, an audio scene generator comprising a spatially extended sound source data generator 6010, a modification data generator 6020 and an output interface 6030. The spatially extended sound source data generator 6010 is configured for generating data of the spatially extended sound source and for providing this data to the output interface. This data advantageously comprises at least one of a location information, and orientation information and geometry data for the spatially extended sound source as metadata for the spatially extended sound source and, additionally, may comprise waveform data for the SESS such as a stereo signal for the SESS in case of, for example, a large SESS such as a grand piano, or only a mono signal for the SESS data that is processed by the decorrelator illustrated, for example, in FIG. 10 at element 310 or in FIG. 13 at element 3100.

The modification data generator 6020 is configured for generating modification data, and this modification data may comprise a description of a low pass function or a description of geometry data on a potentially modifying object. In an embodiment, the low pass function comprises an attenuation value for a higher frequency, the attenuation value for the higher frequency representing an attenuation value being stronger compared to an attenuation value for a lower frequency, and this data is forwarded to the output interface 6030 for insertion into the generated audio scene description.

Hence, the audio scene description illustrated in FIG. 2*b* is enhanced compared to an SESS description in that not only SESS data is included, but also data on modification objects that are, in itself, not sound sources, but that are elements that modify a sound field generated by a sound source.

Figure 3:
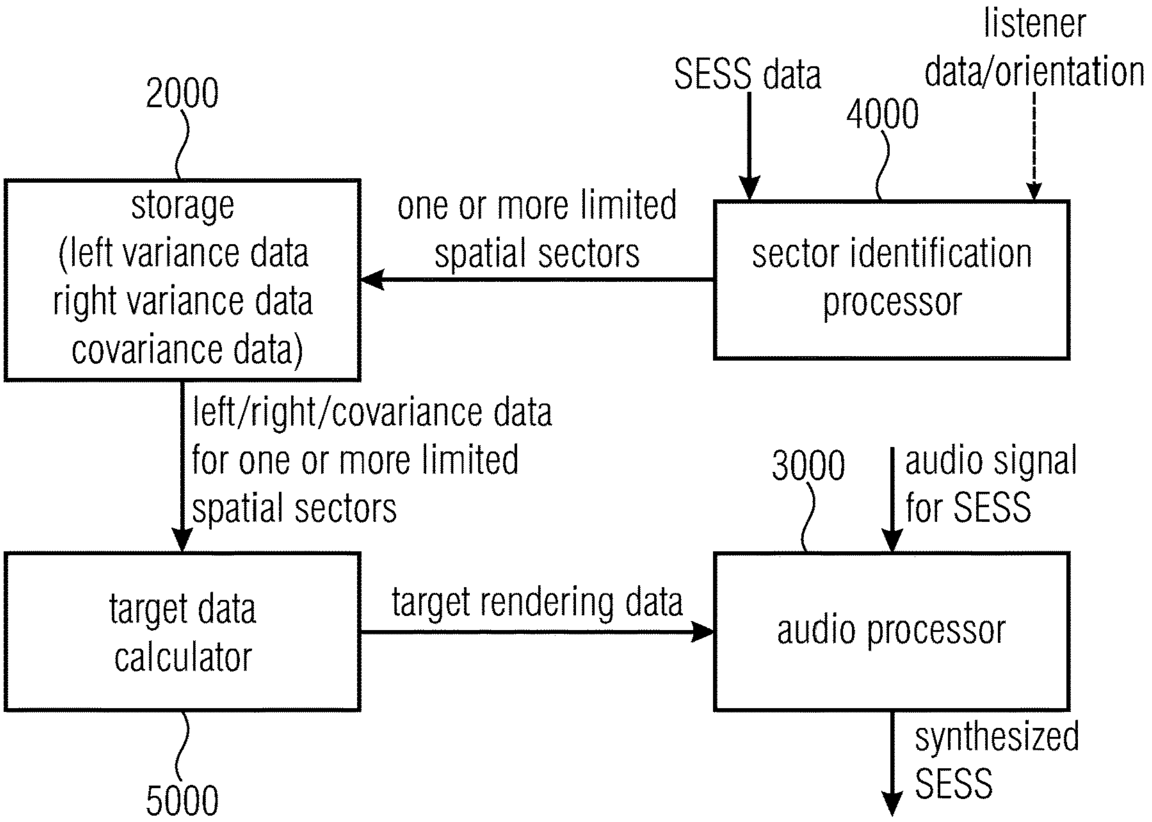
FIG. 3 illustrates an embodiment of a third aspect of the present invention.

FIG. 3 illustrates an embodiment of an apparatus for synthesizing a spatially extended sound source in accordance with a third aspect.

This element comprises a storage for storing one or more rendering data items for different limited spatial sectors, wherein the different limited spatial sectors are located in a rendering range for a listener, and wherein the one or more rendering data items for a limited spatial sector comprises at least one of a left variance data item, a ride variance data item, and a left-right covariance data item.

Furthermore, the apparatus comprises a sector identification processor 4000 for identifying one or more limited spatial sectors for the spatially extended sound source within the rendering range for the listener based on the spatially extended sound source data and advantageously based on the listener position or orientation.

The left variance data, the right variance data and the covariance data are input into a target data calculator 5000 for calculating target rendering data from the stored left variance data, the stored right variance data or the stored covariance data corresponding to the one or more limited spatial sectors as determined by the sector identification processor 4000. The target rendering data is forwarded to an audio processor 3000 for processing an audio signal representing the spatially extended sound source using the target rendering data. Generally, the audio processor 3000 can be implemented in the same way as in FIGS. 1 and 2*b* or FIGS. 4, 5, and 6, or the audio processor 3000 may be implemented differently.

Preferably, the left variance data item, the right variance data item and/or the left-right covariance data items are data items related to head related transfer function data, or related to binaural room impulse response data or related to binaural room transfer function data or related to head related impulse response data. Furthermore, the rendering data items comprise variance or covariance data item values for different frequencies, so that a frequency selective/frequency-dependent processing is achieved.

Particularly, the storage 2000 is configured for storing, for each limited spatial sector, a frequency dependent representation of the left variance data item, a frequency dependent representation of the right variance data item and a frequency dependent representation of the covariance data item.

The upstream processing of the stored variance/covariance data items is exemplified in several figures from WO2021/180935 indicated subsequently as FIGS. 4, 5, and 6.

Figure 4:
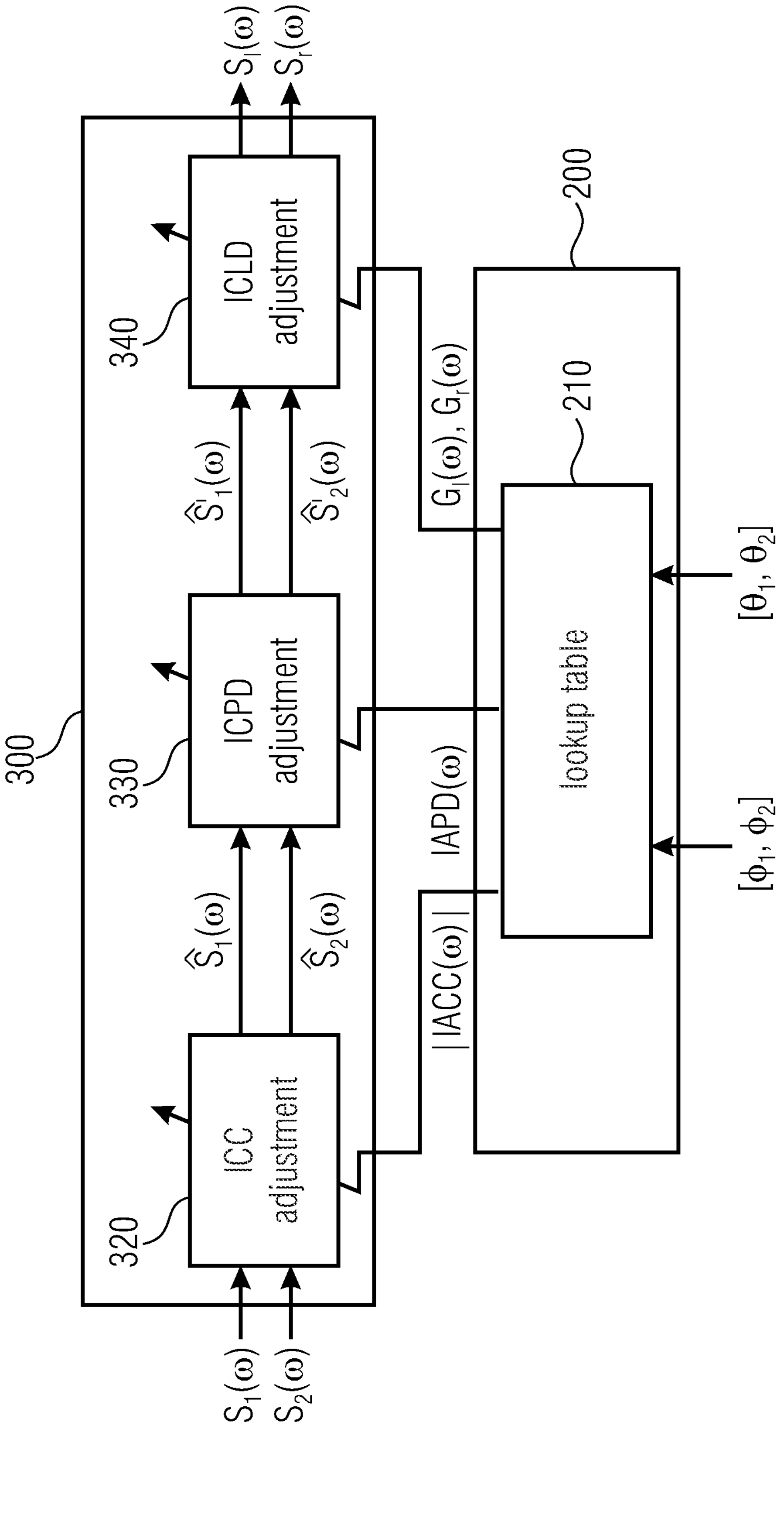
FIG. 4 illustrates a block diagram for illustrating certain portions of the inventive aspects.

FIG. 4 shows a block diagram of an SESS synthesis. FIG. 5 shows another block diagram of an SESS synthesis, simplified in accordance with option 1, and FIG. 6 shows a block diagram of an SESS synthesis, simplified in accordance with option 2.

FIG. 4 illustrates an implementation of an apparatus for synthesizing a spatially extended sound source. The apparatus comprises a spatial information interface that receives a spatial range indication information input indicating a limited spatial range for the spatially extended sound source within a maximum spatial range. The limited spatial range is input into a cue information provider 200 configured for providing one or more cue information items in response to the limited spatial range given by the spatial information interface. The cue information item or the several cue information items are provided to an audio processor 300 configured for processing an audio signal representing the spatially extended sound source using the one or more cue information items provided by the cue information provider 200. The audio signal for the spatially extended sound source (SESS) may be a single channel or may be a first audio channel and a second audio channel or may be more than two audio channels. However, for the purpose of having a low processing load, a small number of channels for the spatially extended sound source or, for the audio signal representing the spatially extended sound source is of advantage.

Figure 10:
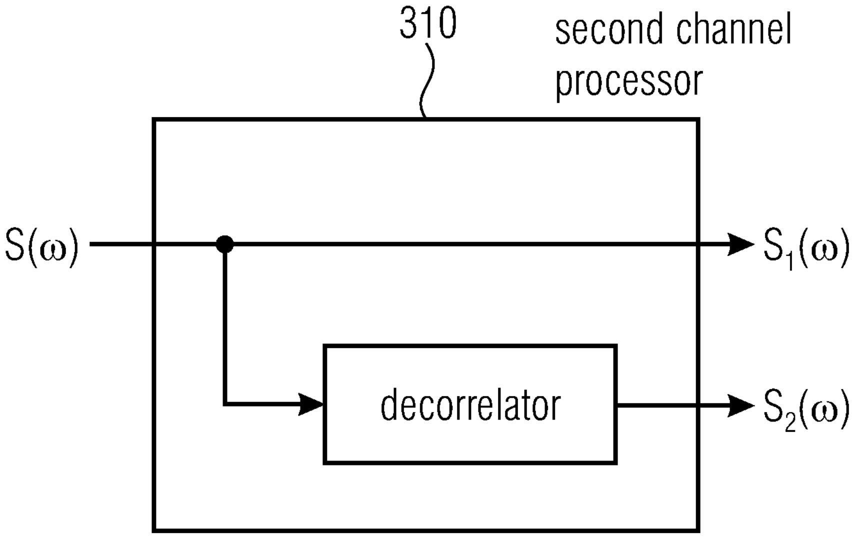
FIG. 10 illustrates an implementation of a second channel processor.

The audio signal is input into the audio processor 300 and the audio processor 300 processes the input audio signal or, when the number of input audio channels is smaller than required such as only one, the audio processor comprises a second channel processor 310 illustrated in FIG. 10 comprising, for example, a decorrelator for generating a second audio channel $S_2$ decorrelated from the first audio channel S that is also illustrated in FIG. 10 as $S_1$. The cue information items can be actual cue items such as inter-channel correlation items, inter-channel phase difference items, inter-channel level difference and gain items, gain factor items $G_1$, $G_2$, together representing an inter-channel level difference and/or absolute amplitude or power or energy levels, for example, or the cue information items can also be actual filter functions such as head related transfer functions with a number as required by the actual number of to be synthesized output channels in the synthesis signal. Thus, when the synthesis signal is to have two channels such as two binaural channels or two loudspeaker channels, one head related transfer function for each channel is used. Instead of head related transfer functions, head related impulse response functions (HRIR) or binaural or non-binaural room impulse response functions (B)RIR are used. One such transfer function is used for each channel and FIG. 4 illustrates the implementation of having two channels.

In an embodiment, the cue information provider 200 is configured to provide, as a cue information item, an inter-channel correlation value. The audio processor 300 is configured to actually receive, via the audio signal interface 305, a first audio channel and a second audio channel. When, however, the audio signal interface 305 only receives a single channel, the optionally provided second channel processor generates, for example, by means of the procedure in FIG. 9, the second audio channel. The audio processor performs a correlation processing to impose a correlation between the first audio channel and the second audio channel using the inter-channel correlation value.

In addition, or alternatively, a further cue information item can be provided such as an inter-channel phase difference item, an inter-channel time difference item, an inter-channel level difference and a gain item or a first gain factor and a second gain factor information item. The items can also be interaural (IACC) correlation values, i.e., more specific interchannel correlation values, or interaural phase difference items (IAPD) i.e., more specific interchannel phase difference values.

In an embodiment, the correlation is imposed 320 by the audio processor 300 in response to the correlation cue information item, before ICPD (330), ICTD or ICLD (340) adjustments are performed or, before, HRTF or other transfer filter function processings (350) are performed. However, as the case may be, the order can be set differently.

In an embodiment, the apparatus comprises a memory for storing information on different cue information items in relation to different spatial range indications. In this situation, the cue information provider additionally comprises an output interface for retrieving, from the memory, the one or more cue information items associated with the spatial range indication input into the corresponding memory. Such a look-up table 210 is, for example, illustrated in FIG. 4, 5, or 6, where the look-up table comprises a memory and an output interface for outputting the corresponding cue information items. Particularly, the memory may not only store IACC, IAPD or $G_l$ and $G_r$ values as illustrated in FIG. 1*b*, but the memory within the look-up table may also store filter functions as illustrated in block 220 of FIG. 5 and FIG. 6 indicated as “select HRTF”. In this embodiment, although illustrated separately in FIG. 5 and FIG. 6, the blocks 210, 220 may comprise the same memory where, in association with the corresponding spatial range indication indicated as azimuth angles and elevation angles, the corresponding cue information items such as IACC and, optionally, IAPD and transfer functions for filters such as HRTFi for the left output channel and HRTFr for the right output channel are stored, where the left and right output channels are indicated as $S_l$ and $S_r$ in FIG. 4 or FIG. 5 or FIG. 6.

The memory used by the look-up table 210 or the select function block 220 may also use a storage device where, based on certain sector codes or sector angles or sector angle ranges, the corresponding parameters are available. Alternatively, the memory may store a vector codebook, or a multi-dimensional function fit routine, or a Gaussian Mixture Model (GMM) or a Support Vector Machine (SVM) as the case may be.

The target cues are calculated as described in the following. In FIG. 4, a general block diagram of the concept is shown. $[\phi_1, \phi_2]$ describes the desired source extent in terms of azimuth angle range. $[\theta_1, \theta_2]$ is the desired source extent in terms of elevation angle range. $S_1(\omega)$ and $S_2(\omega)$ denote two decorrelated input signals, with a describing the frequency index. For $S_1(\omega)$ and $S_2(\omega)$ thus the following equation holds:

$$E\{S_1(\omega)\cdot S_2^*(\omega)\}=0. \quad (1)$$

Additionally, both input signals need to have the same power spectral density. As an alternative it is possible to only give one input signal, $S(\omega)$. The second input signal is generated internally using a decorrelator as depicted in FIG. 10. Given $S_l(\omega)$ and $S_r(\omega)$, the extended sound source is synthesized by successively adjusting the Inter-Channel Coherence (ICC), the Inter-Channel Phase Differences (ICPD) and the Inter-Channel Level Differences (ICLD) to match the corresponding interaural cues. The quantities needed for these processing steps are read from the pre-calculated look-up table. The resulting left and right channel signals, $S_l(\omega)$ and $S_r(\omega)$ can be played back via headphones and resemble the SESS. It should be noted that the ICC adjustment has to be performed first, the ICPD and ICLD adjustment blocks however can be interchanged. Instead of the IAPD, the corresponding Interaural Time Differences (IATD) could be reproduced as well. However, in the following only the IAPD is considered further In the ICC adjustment block, the cross-correlation between both input signals is adjusted to a desired value $|IACC(\omega)|$ using the following formulas [21]:

$$\hat{S}_1(\omega)=H_\alpha(\omega)\cdot S_1(\omega)+H_\beta(\omega)\cdot S_2(\omega), \quad (2)$$

$$\hat{S}_2(\omega)=H_\alpha(\omega)\cdot S_2(\omega)+H_\beta(\omega)\cdot S_1(\omega), \quad (3)$$

$$H_\beta(\omega)=H_\alpha(\omega)\sqrt{\frac{1}{2}\left(1-\sqrt{1-|IACC(\omega)|^2}\right)}, \quad (4)$$

$$H_\alpha(\omega)=\sqrt{1-H_\beta^2(\omega)}. \quad (5)$$

Figure 9:
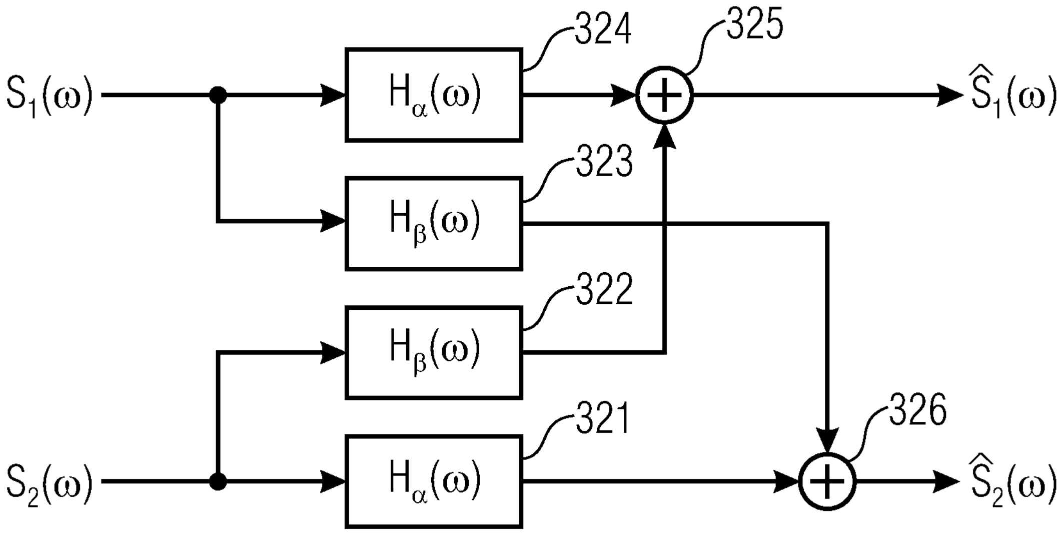
FIG. 9 illustrates an implementation of block 320 of FIGS. 4, 5, and 6.

Applying these formulas results in the desired cross-correlation, as long as the input signals $S_1(\omega)$ and $S_2(\omega)$ are fully decorrelated. Additionally, their power spectral density needs to be identical. The corresponding block diagram is shown in FIG. 9. Four filters 321 to 324 and two adders 325, 326 process the input to obtain the output of the block 320.

The ICPD adjustment block 330 is described by the following formulas:

$$\hat{S}_1'(\omega)=e^{j\cdot IAPD(\omega)}\cdot\hat{S}_1(\omega), \quad (6)$$

$$\hat{S}_2'(\omega)=\hat{S}_2(\omega). \quad (7)$$

Finally, the ICLD adjustment 340 is performed as follows:

$$S_l(\omega)=G_l(\omega)\cdot\hat{S}_1'(\omega), \quad (8)$$

$$S_r(\omega)=G_r(\omega)\cdot\hat{S}_2'(\omega), \quad (9)$$

where $G_l(\omega)$ describes the left ear gain and $G_r(\omega)$ describes the right ear gain. This results in the desired ICLD as long as $$\hat{S}_1'(\omega)$$

and $$\hat{S}_2'(\omega)$$

do have the same power spectral density. As left and right ear gain are used directly, monaural spectral cues are reproduced in addition to the IALD.

In order to further simplify the previously discussed method, two options for simplification are described. As mentioned earlier, the main interaural cue influencing the perceived spatial extent (in the horizontal plane) is the IACC. It would thus be conceivable to not use precalculated IAPD and/or IALD values, but adjust those via the HRTF directly. For this purpose, the HRTF corresponding to a position representative of the desired source extent range is used. As this position, the average of the desired azimuth/elevation range is chosen here without loss of generality. In the following, a description of both options is given.

The first option involves using precalculated IACC and IAPD values. The ICLD however is adjusted using the HRTF corresponding to the center of the source extent range.

Figure 5:
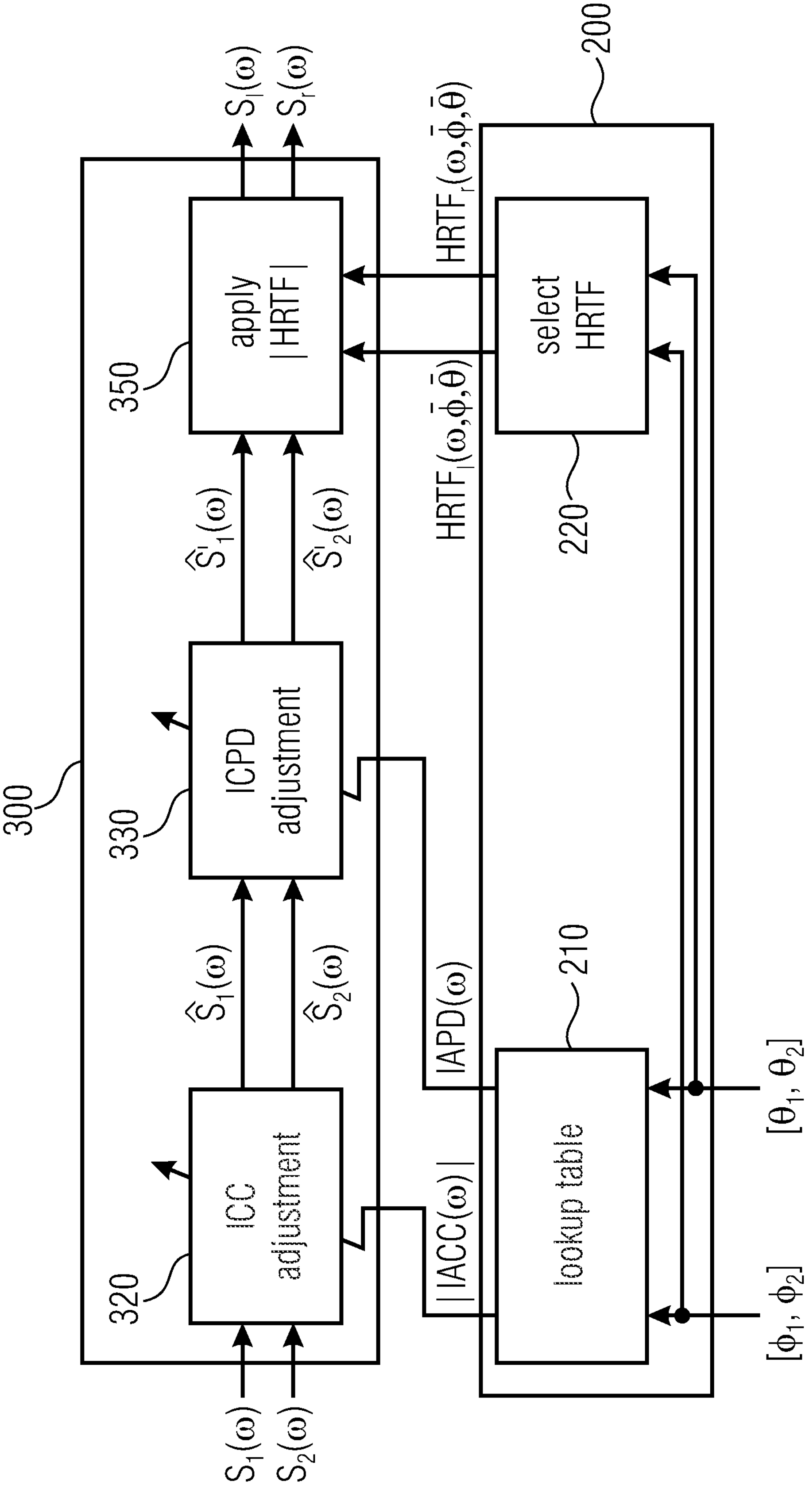
FIG. 5 illustrates another block diagram for illustrating several portions of the inventive aspects.

A block diagram of the first option is shown in FIG. 5. $S_l(\omega)$ and $S_r(\omega)$ are now calculated using the following formulas:

$$S_l(\omega)=\hat{S}_1'(\omega)\cdot\left|HRTF_l(\omega,\overline{\phi},\overline{\theta})\right|, \quad (10)$$

$$S_r(\omega)=\hat{S}_2'(\omega)\cdot\left|HRTF_r(\omega,\overline{\phi},\overline{\theta})\right|. \quad (11)$$

with $\overline{\phi}=(\phi_1+\phi_2)/2$ and $\overline{\theta}=(\theta_1+\theta_2)/2$ describing the location of an HRTF that represents an average of the desired azimuth/elevation range. The main advantages of the first option include:

- No spectral shaping/coloring when source extent is increased compared to a point source in the center of the source extent range.
- Lower memory requirements compared to the full-blown, as $G_l(\omega)$ and $G_r(\omega)$ do not have to be stored in the look-up table.
- More flexible to changes in the HRTF data set during runtime compared to the full-blown method, as only resulting ICC and ICPD, but not ICLD, depend on the HRTF data set used during pre-calculation.

The main disadvantage of this simplified version is that it will fail whenever drastic changes in the IALD occur, compared to the not extended source. In this case, the IALD will not be reproduced with sufficient accuracy. This is for example the case when the source is not centered around 0° azimuth and at the same time the source extent in horizontal direction becomes too large.

The second option involves using pre-calculated IACC values only. The ICPD and ICLD are adjusted using the HRTF corresponding to the center of the source extent range.

Figure 6:
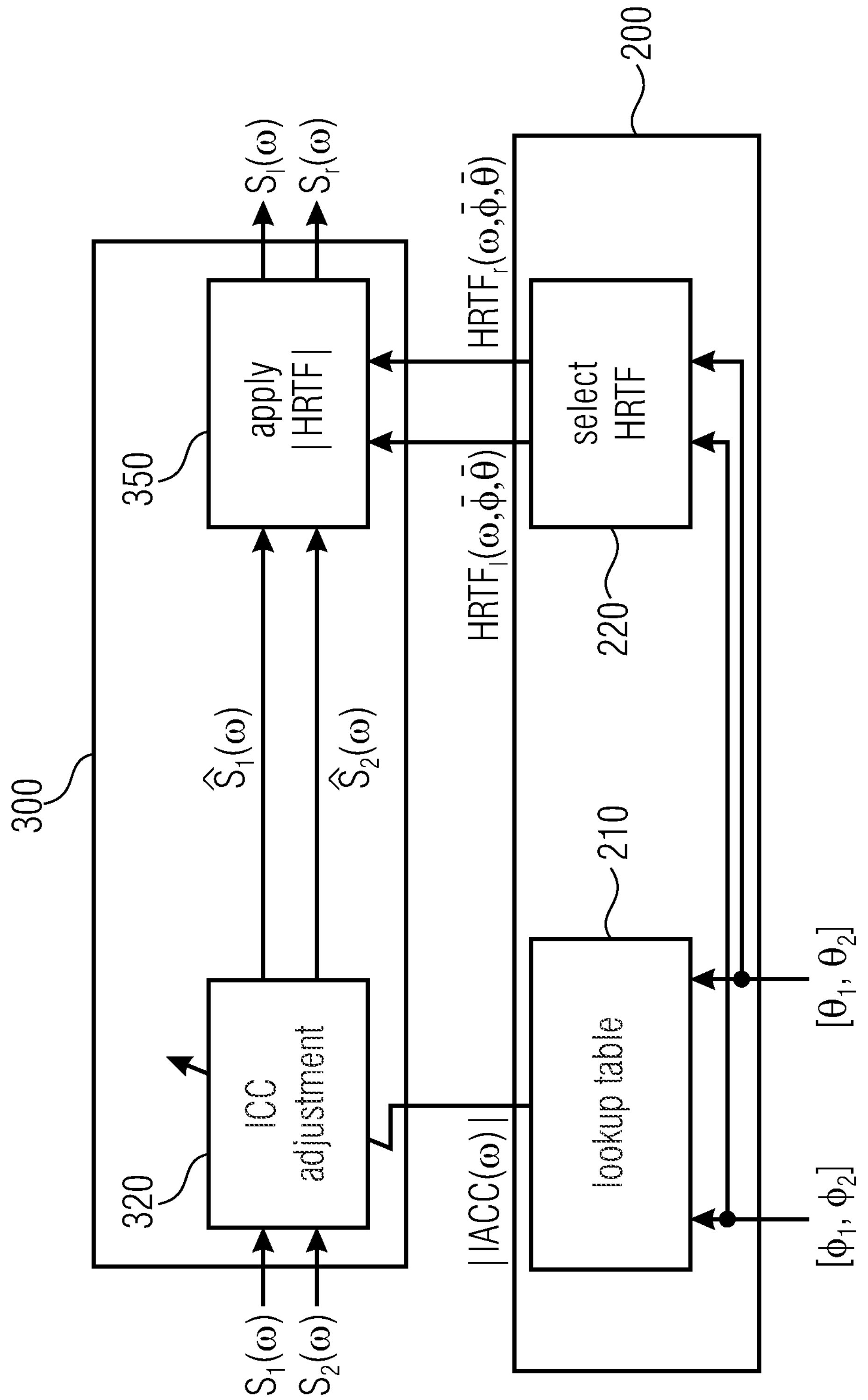
FIG. 6 illustrates a further block diagram for illustrating portions of the inventive aspects.

A block diagram of the second option is shown in FIG. 6. $S_l(\omega)$ and $S_r(\omega)$ are now calculated using the following formulas:

$$S_l(\omega) = \hat{S}_1(\omega)\cdot HRTF_l(\omega, \overline{\phi}, \overline{\theta}), \quad (12)$$

$$S_r(\omega) = \hat{S}_2(\omega)\cdot HRTF_r(\omega, \overline{\phi}, \overline{\theta}). \quad (13)$$

In contrast to the first option, phase and magnitude of the HRTF are now used instead of magnitude only. This allows to not only adjust the ICLD but also the ICPD.

First, the (co)variance terms are calculated between left and right channel as follows:

$E\{Y_l(\omega)\cdot Y_r^*(\omega)\}$, $E\{|Y_l(\omega)|^2\}$ and $E\{|Y_r(\omega)|^2\}$ are derived: (20)

$$\begin{aligned} E\{Y_l(\omega)\cdot Y_r^*(\omega)\} &= E\left\{\sum_{n=1}^{N} A_{l,n}\cdot e^{j\phi_{l,n}}\cdot S_n(\omega)\cdot \sum_{m=1}^{N} A_{r,m}\cdot e^{-j\phi_{r,m}}\cdot S_m^*(\omega)\right\} \\ &= E\left\{\sum_{n=1}^{N}\sum_{m=1}^{N} A_{l,n}\cdot A_{r,m}\cdot e^{j(\phi_{1,n}-\phi_{r,m})}\cdot S_n(\omega)\cdot S_m^*(\omega)\right\} \\ &\stackrel{1}{=} \sum_{n=1}^{N}\sum_{m=1}^{N} A_{l,n}\cdot A_{r,m}\cdot e^{j(\phi_{l,n}-\phi_{r,m})}\cdot E\{S_n(\omega)\cdot S_m^*(\omega)\} \\ &= P(\omega)^2\cdot \sum_{n=1}^{N} A_{l,n}\cdot A_{r,n}\cdot e^{j(\phi_{l,n}-\phi_{r,n})}, \end{aligned}$$

$$\begin{aligned} E\{|Y_l(\omega)|^2\} &= E\left\{\sum_{n=1}^{N} A_{l,n}\cdot e^{j\phi_{l,n}}\cdot S_n(\omega)\cdot \sum_{m=1}^{N} A_{l,m}\cdot e^{-j\phi_{l,m}}\cdot S_m^*(\omega)\right\} \quad (21) \\ &= E\left\{\sum_{n=1}^{N}\sum_{m=1}^{N} A_{l,n}\cdot A_{l,m}\cdot e^{j(\phi_{l,n}-\phi_{l,m})}\cdot S_n(\omega)\cdot S_m^*(\omega)\right\} \\ &\stackrel{1}{=} \sum_{n=1}^{N}\sum_{m=1}^{N} A_{l,n}\cdot A_{l,m}\cdot e^{j(\phi_{l,n}-\phi_{l,m})}\cdot E\{S_n(\omega)\cdot S_m^*(\omega)\} \\ &= P(\omega)^2\cdot \sum_{n=1}^{N} A_{l,n}^2, \end{aligned}$$

$$E\{|Y_r(\omega)|^2\} = P(\omega)^2\cdot \sum_{n=1}^{N} A_{r,n}^2. \quad (22)$$

In a second step, the target cues IACC, IALD and IAPD are calculated from the variance terms as follows:

$$\begin{aligned} IACC(\omega) &= \frac{E\{Y_l(\omega)\cdot Y_r^*(\omega)\}}{\sqrt{E\{|Y_l(\omega)|^2\}\cdot E\{|Y_r(\omega)|^2\}}} \quad (23) \\ &= \frac{\sum_{n=1}^{N} A_{l,n}\cdot A_{r,n}\cdot e^{j(\phi_{l,n}-\phi_{r,n})}}{\sqrt{\sum_{n=1}^{N} A_{ln}^2 \sum_{m-1}^{N} A_{r,m}^2}}, \end{aligned}$$

$$\begin{aligned} IALD(\omega) &= 10\log_{10}\frac{E\{|Y_l(\omega)|^2\}}{E\{|Y_r(\omega)|^2\}} \quad (24) \\ &= 10\log_{l0}\frac{\sum_{n=1}^{N} A_{l,n}^2}{\sum_{n=1}^{N} A_{r,n}^2}, \end{aligned}$$

$$\begin{aligned} IAPD(\omega) &= \angle\left(E\{Y_l(\omega)\cdot Y_r^*(\omega)\}\right) \quad (25) \\ &= \angle\left(IACC((\omega)\right) \\ &= \angle\left(\sum_{n=1}^{N} A_{l,n}\cdot A_{r,n}\cdot e^{j(\phi_{l,n}-\phi_{r,n})}\right). \end{aligned}$$

as well as the left and right ear gains:

$$G_l(\omega) = \sqrt{\frac{E\{|Y_l(\omega)|^2\}}{N\cdot P(\omega)^2}} = \sqrt{\frac{\sum_{n=1}^{N} A_{l,n}^2}{N}} \quad (26)$$

$$G_r(\omega) = \sqrt{\frac{E\{|Y_r(\omega)|^2\}}{N\cdot P(\omega)^2}} = \sqrt{\frac{\sum_{n=1}^{N} A_{r,n}^2}{N}} \quad (27)$$

From these target cues, the final efficient synthesis of the binaural signal can be performed by designing 4 filters transforming the input sound into the rendered binaural output as explained in WO2021/180935.

A first aspect relates to the usage of elementary spatial sectors. This first aspect relates to the storing of data for elementary spatial sectors in the look-up table, where the elementary spatial sectors are distributed over the sphere. The data for the elementary spatial sectors are advantageously tied to the user head forming a user-centric audio scene and are the same for each inclination of the head at the same position and also for each position of the listener head, i.e., for each degree of freedom of the 6-DOF. However, each movement or inclination of the head results in a situation that the sound from the SESS "enters" at another one or more elementary spatial sectors into the user head. The renderer determines the elementary spatial sectors covered by the SESS, retrieves the stored data for these specific sectors, optionally performs a weighting of the stored data due to occluding objects or certain distances, and then combines the stored data (or in case of weighting the weighted stored data), and, then uses the result of the combination operation for rendering (e.g. rendering cues are calculated from combined (co)-variance data, but other steps and parameters can be used here as well. Hence, this aspect may or may not use a reference to occluding objects and may or may not use a reference to the specific stored variance data, since the combination (and optionally also the weighting) can also be done when other data are stored such as the (mean) HRTFs (for an elementary spatial sector or for a whole spatial extent) or even the frequency dependent cues themselves.

A second aspect relates to modifying objects that can be occluding objects or other objects resulting in a modification of the sound of the SESS on its way from the SESS position to the user having a certain location and/or inclination. This second aspect relates to the treatment of e.g. occluding objects. The influence of the occluding object is a frequency-dependent attenuation having a low-pass characteristic. The frequency dependent weighting can also be applied to the known procedure, where one does not have any elementary spatial sectors. Based on transmitted data describing occluding objects, one would have to decide, whether a SESS is occluded or not and then apply the occluding function to the e.g. frequency dependent stored cues, that are already given for different frequencies in the known technology. Hence, this is a useful application of the occluding effect in the known technology without the usage of elementary spatial sectors or without the usage of stored variance data.

A third aspect relates to the storage of variance data and covariance data for e.g. HRTFs for different spatial extents or elementary spatial sectors. This third aspect relates to the storage, e.g. in a look-up table, of variance data and covariance data for e.g. HRTFs in a storage position. It is not relevant, whether one stores this data for a certain spatial extent as in the known technology or for an elementary spatial sector. The renderer then calculates all rendering cues from the stored variance data on the fly. In contrast to the known application, where at least the IACC is stored and probably other cues or HRFT data, his is not done in this aspect. Covariance data is stored and the cues are calculated on the fly. Hence, this aspect may or may not use the elementary spatial sectors and may or may not use any modifying or occluding objects.

All aspects can be used separate from each other or together with each other or only arbitrarily selected two aspects can be combined as well.

It is an advantage of the present invention to provide an enhanced efficient and realistic binaural rendering for a spatially extended sound source compared to WO2021/180935 by e.g.

organizing the lookup table for target cue calculation in a specific way (sector-based, using (co)variance terms, frequency dependent); or performing a (frequency selective) weighting of the (co)variance terms according to a desired target frequency response, as used by the synthesis of (partially or fully) occluded parts of the SESS or to model distance attenuation for certain.

Embodiments of the present invention extend the previously described concept from WO2021/180935 for efficient rendering of SESSs in several ways to enhance storage efficiency and enable the capability of rendering also partially occluded parts of an SESS:

An especially efficient way of organizing the lookup table and the target cue calculation based on the lookup table is disclosed which allows to cover all possible spatial target regions for an SESS into a lookup table with a small size. This is achieved by organizing the lookup table as a table that partitions the entire sphere around the listener's head into small azimuth/elevation sectors. The size of these sectors (i.e. their azimuth and elevation size) is advantageously chosen in accordance with the resolution of human azimuth/elevation perception. For example, the human auditory resolution for azimuth is finest (ca. 1 degree) in front and decreases towards the side. Also, the resolution in elevation perception is much coarser than the resolution on azimuth because of the listener's ears being located left and right on the head. For each of these spatial sectors, specific partially summed terms are stored in the lookup table. In an embodiment, these are the (co)variance terms ($E\{Yl\cdot Yr^*\}$, $E\{|Yl|^2\}$, $E\{|Yr|^2\}$) of the two ear signals when many point sources (described by their respective Head-related Impulse Responses, HRIRs, and driven by decorrelated signal versions=diffuse field) are summed up. Furthermore, in an embodiment, these table entries are stored in a frequency selective way ($E\{Yl\cdot Yr^*\}$, $E\{|Yl|^2\}$, $E\{|Yr|^2\}$).

This is also achieved alone or in addition to the above, since the cue calculation process makes use of these summed terms ($E\{Y_l\cdot Y'_r\}$, $E\{|Y_l|^2\}$, $E\{|Y_r|^2\}$) from the HRIR contributions that are stored for each spatial sector such that—when several sectors should be covered—the (co)variance data for these sectors can simply be added to generate the (co)variance data for the entire target region (including all sectors).

Furthermore, a spatial weighting of certain spatial sectors (e.g. to model occlusion of this part of the SESS) can be achieved by weighting the (co)variance data stored for these spatial sectors before using them in the subsequent cue calculation process. Specifically, a desired target frequency response g(f) can be imposed by multiplying all (co)variance terms with the corresponding energy scaling factor $g^2(f)$. As an example, an occluding bush would impose an attenuation and a lowpass frequency response when sound propagates through it. Thus, the (co)variance terms would be attenuated and terms of the higher frequencies are attenuated more than those of the low frequencies. Several zones for different occlusions/weighting are possible. In a similar way, also modeling of object distance is possible: For large objects like rivers, parts of the object may be substantially farther away from the listener that others, thus contributing less loudness that the nearby parts. This can be modeled and rendered by distance weighting of the different spatial sectors. The terms in the spatial sectors are weighted with a distance energy attenuation factor corresponding to the (e.g. average) distance of the object in this spatial sector.

An overview of an embodiment of the inventive method or apparatus or computer program is provided hereafter:

In the initialization/start-up phase of the renderer, a partitioning of the sphere around the listener's head is done by defining spatial sectors (e.g. azimuth & elevation angle ranges) over which HRIR contributions can later be summed. Then, based on these spatial sectors, the corresponding HRIR contributions can be stored in a look-up table using (co)variance terms.

Figure 11:
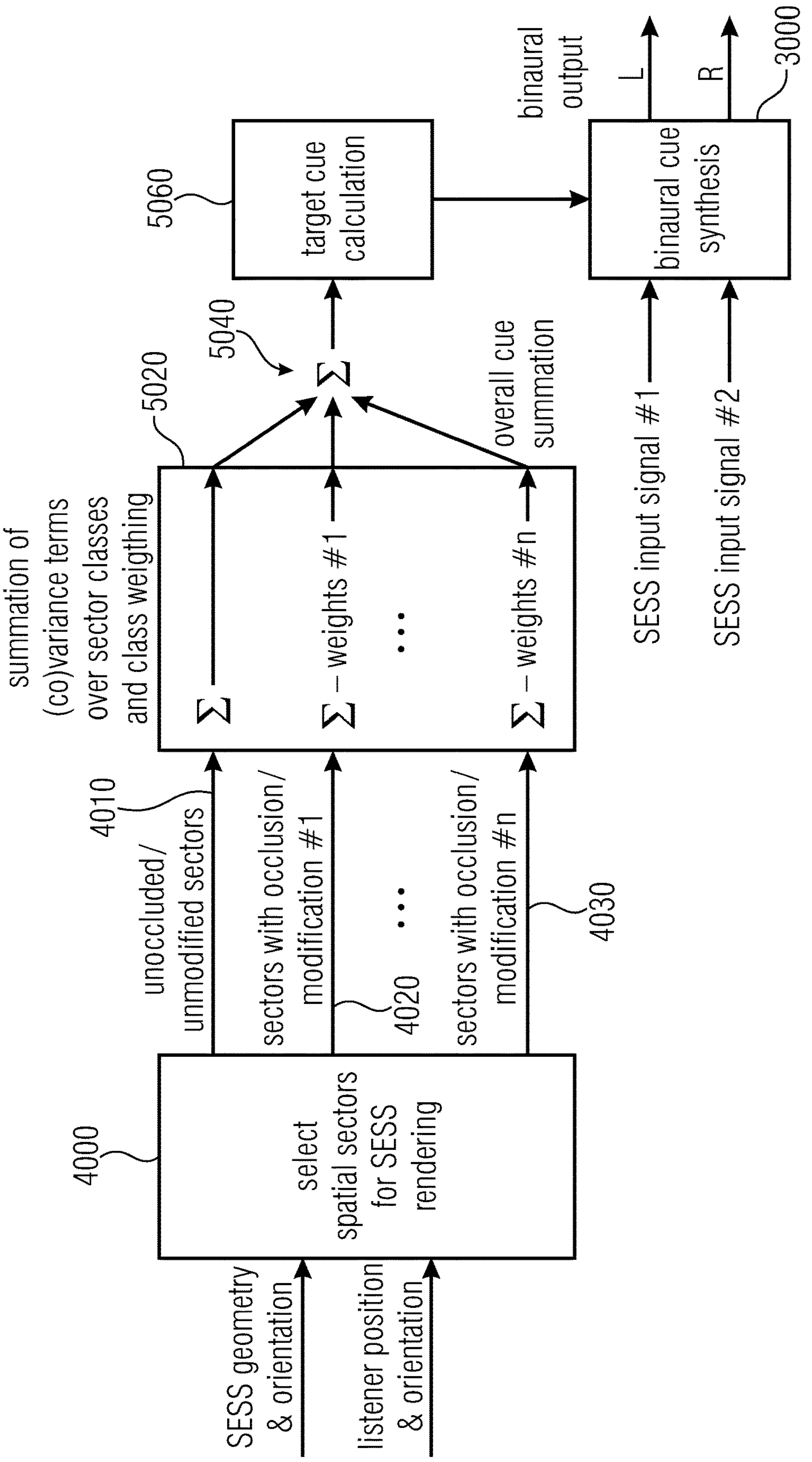
FIG. 11 illustrates a schematic diagram particularly showing features of the first aspect and the second aspect of the invention.

FIG. 11 illustrates a further overview over the present invention (method or apparatus or computer program) implementing a cooperation of the first aspect and the second aspect. Particularly, the block "select spatial sectors for SESS rendering" corresponds to the sector identification processor 4000 illustrated in FIGS. 1 to 3. The result of the selection of spatial sectors are a group of spatial sectors where there can be some sectors without any modification illustrated at 4010. Furthermore, among the determined sectors can be sectors with an occlusion modification in accordance with a first characteristic illustrated at 4020. Furthermore, there can also be sectors with another occlusion modification illustrated as "number N". This is illustrated at 4030. The specific target data calculation illustrated by the target data calculator 5000 particularly for the second aspect performs a summation of variance terms for the left side, variance terms for the right side and covariance terms for all unoccluded sectors in case there are more than one such sectors. Additionally, a summation in accordance with weighting function 1 is performed, i.e., if there are more than 1 sectors with an occlusion in accordance with an occlusion/modification number 1, these are summed-up and then a corresponding weight is applied or the weighting operation and the summing-up operation can be exchanged. Furthermore, in case there are other sectors with an occlusion modification number N as illustrated at 4030, such sectors can be summed-up with the corresponding weight for the specific weighting/modification function for these sectors.

Naturally, the case can be that only unoccluded sectors are existent for an SESS or only occluded sectors in accordance with a single modification function are there or any mixture between these possibilities, i.e., one sector unoccluded and once sector with an occlusion/modification number 1, but no one for occlusion/modification number N. naturally, the number "N" can also be equal to 1 so that only lines 4010 and 4020 exist, but any modification with another modification on top of modification number 1 is not determined by block 4000.

As soon as the individual weighting for the individual occlusion/modifications have been performed in block 5020, the overall cue summation in block 5040 takes place, and then the input data for the final target cue calculation 5060 is performed. This target cue data is then input into the binaural cue synthesis or audio processor block 3000 of FIG. 11. The input into block 3000 is the SESS input signal number 1 and the SESS input signal number 2 if the SESS has a stereo waveform signal. In case of an SESS having a mono waveform signal only, nevertheless two signals are generated, but with the decorrelator illustrated at 3100 in FIG. 13 or illustrated at 3010 in FIG. 10.

Figure 12:
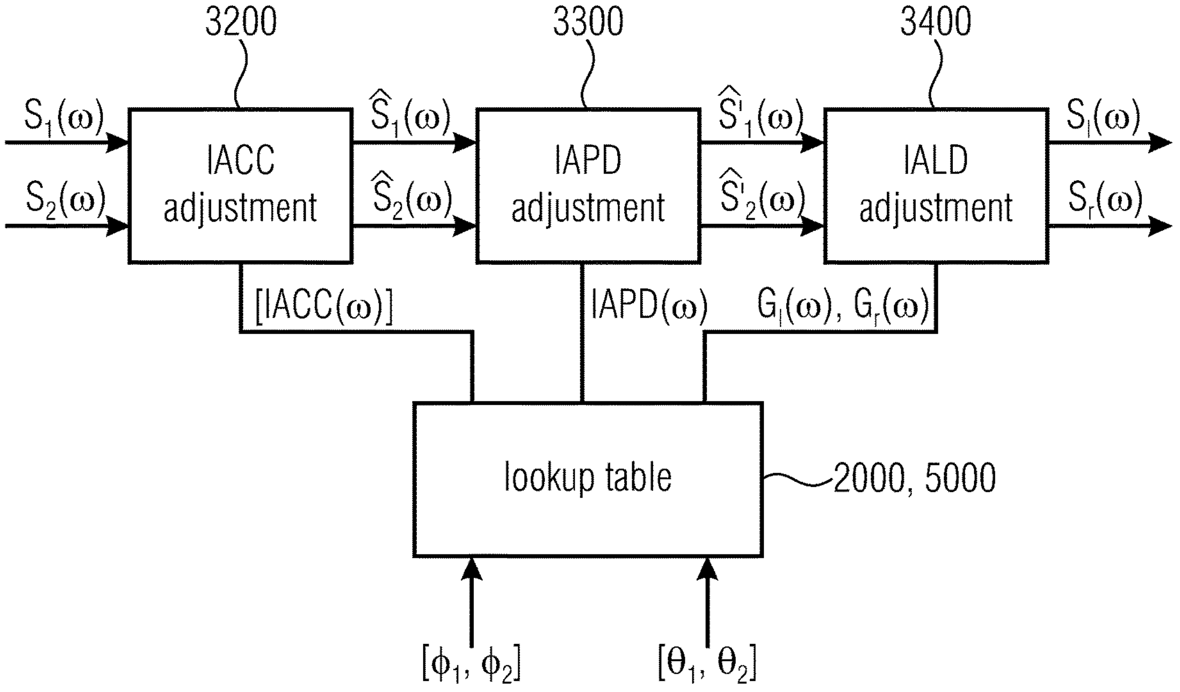
FIG. 12 illustrates an illustration for explaining the inventive first, second, and third aspects.

FIG. 12 illustrates an implementation of the binaural cue synthesis 3000 consisting of an IACC adjustment 3200, an IAPD adjustment 3300 and an IALD adjustment 3400. All these blocks are provided with data from the storage indicated as "look up table" in block 2000. However, depending on the implementation, the corresponding processings for determining the final values for IACC, IAPD, and IALD are also generated in block 2000 in accordance with target data calculation steps 5020, 5040, 5060. Therefore, the block titled "look up table" in FIG. 12 is provided with reference number 2000 and reference number 5000. However, the input into this block is provided by the sector identification processor 4000 of any of FIGS. 1, 2*a*, 3, 11.

Figure 13:
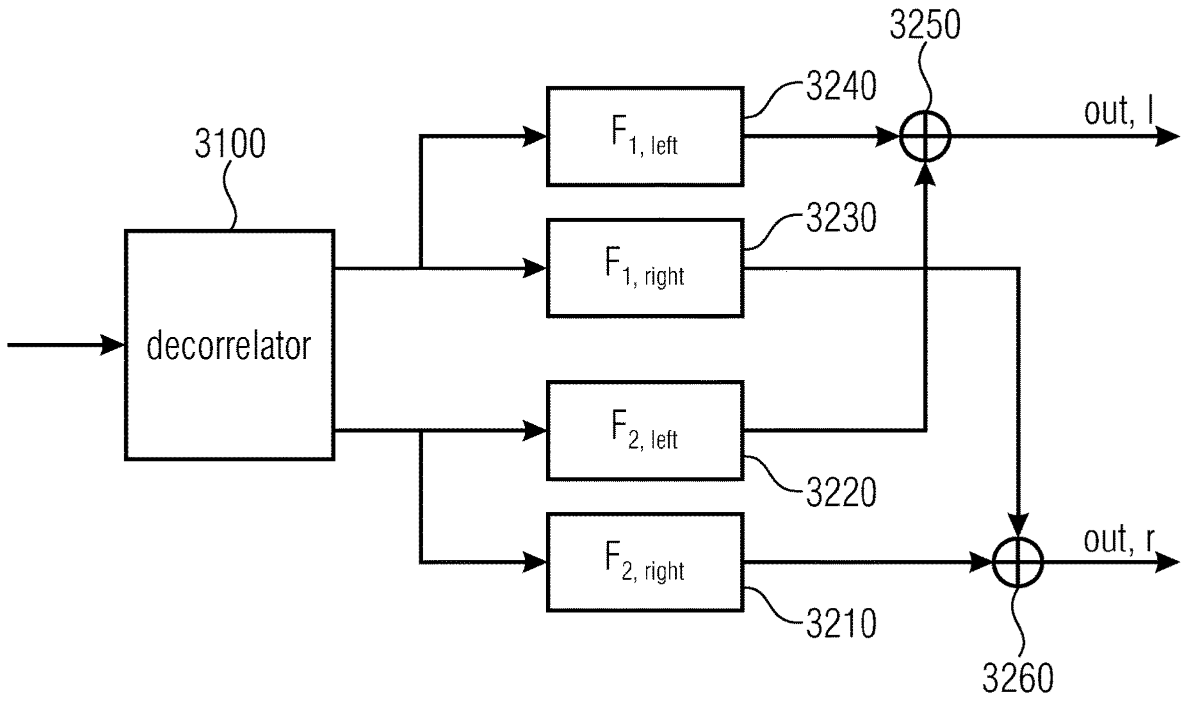
FIG. 13 illustrates a decorrelator of FIG. 10 connected with the audio processor synthesis in accordance with a further embodiment.

FIG. 13 illustrates, at the left hand side, a decorrelator 3100 for generating, from a single SESS waveform signal, the two SESS input signals number 1 and number 2 at the output of the decorrelator. This data is then subjected to four filtering operations 3210, 3220, 3230 and 3240 where corresponding contributions for the left channel are added via adder 3250 and where corresponding contributions of the right channel are added via adder 3260 to obtain the final output signals left and right. The individual filter functions 3210, 3220, 3230 and 3240 are calculated via the target data calculator 5000 either for the correspondingly determined limited spatial range as described in WO 2021/180935 or are calculated in accordance with the plurality of elementary spatial sectors as described with respect to FIG. 7 where a spatially extended sound source is represented by two or more elementary spatial sectors.

The processing for each audio block is depicted in FIG. 11 illustrating an overall flow chart of an embodiment implementing the first aspect, the second aspect and the third aspect together. For each audio signal block, the (time varying) target cues for the target spatial region belonging to the SESS are determined and applied to the two input signals in a Binaural Cue Synthesis Stage to produce the L and R binaural output signals.

The target binaural cues are calculated as follows:

The spatial sectors belonging to SESS considering listener and SESS position & orientation as well as SESS geometry are calculated (e.g. using a projection algorithm or a ray tracing analysis).

Specifically the spatial sectors belonging to parts of the SESS that should be weighted to model effects like occlusion and/or distance attenuation etc. are found. There can be several spatial regions that require different attenuation/frequency response characteristics; the corresponding sectors are processed in each region separately, belonging to different so-called "sector classes" (e.g. "unoccluded", "occlusion/modification #1", . . . "occlusion/modification #n").

The stored (co)variance terms for sectors within each sector class are summed up. Then the summed sector (co)variance data of the different sector classes are weighted according to the desired transmission function for each sector class Specifically, the (co)variance data of that sector class is multiplied with the (frequency dependent) energy transmission function (square of amplitude scaling factor/amplitude frequency response) belonging to this class.

The weighted variance terms for all sector classes of the SESS are summed up into overall (weighted) (co)variance terms.

The target cues using modified/weighted overall (co) variance terms is calculate using equations (23)-(27). Of course, also each sector's (co)variance data can be weighted individually and then be summed up rather than first performing a partial summation within sector classes, weighting once for each sector class and the final summation. The previously described approach is, however, an advantageous embodiment due to its higher efficiency.

Advantages of Embodiments of the Invention over the State of the Art provide a very efficient and more realistic rendering of sized sources (SESSs), a small lookup table size and/or the ability to include rendering effects (like partial occlusion or distance attenuation) that change the frequency response in selected spatial parts of the size source (SESS)

Preferred Examples relate to a renderer that uses as inputs one or more signal channels, the geometry, size and orientation of the spatially extended sound source (SESS) and an HRTF set and is equipped for binaural rendering of spatially extended sound sources (i.e. provides two output signals).

Further advantageous renderers or apparatus and methods for synthesizing a SPESS comprise, in addition or instead of the above, a target cue calculation stage (e.g. for calculating the desired inter-aural target cues) and a cue synthesis stage (e.g. for transforming the input signal(s) into binaurally rendered signals with the desired target cues).

Further advantageous renderers or apparatus and methods for synthesizing a SPESS comprise, in addition or instead of the above, the usage of a lookup table that contains pre-calculated data for the binaural rendering of the SESS and is provided/pre-calculated for different frequency bands depending on the HRTF set.

Further advantageous renderers or apparatus and methods for synthesizing a SPESS comprise, in addition or instead of the above, the lookup table that is organized to store (co)variance terms for each spatial sector (such as l (left) variance, r (right) variance, lr co-variance).

In another embodiment: spatial sectors are defined as azimuth/elevation ranges.

In other embodiments, spatial sector sizes are chosen in relation to the resolution of the human auditory spatial localization abilities (e.g. are wider in elevation than in azimuth direction).

In other embodiments, the computation of the target binaural rendering cues is performed based on the summed variance terms of the spatial sectors belonging to the SESS.

In other embodiments, the modification of rendering of different spatial regions of the SESS (e.g. for occlusion or distance modeling) is achieved by using modified variance terms from the lookup table rather than the originally stored one.

In other embodiments, the modification is done by multiplication of the variance terms with an energy attenuation factor belonging to the spatial sector.

In other embodiments, this attenuation factor is frequency dependent (e.g. to model lowpass effects due to partial occlusion).

A further embodiment relates to a bitstream that includes the following information: Size, position & orientation of the object and waveform, and the geometry of occluding objects.

Subsequently, a further embodiment as currently developed for MPEG I ISO 23090-4 is described:

This embodiment synthesizes one or more Spatially Extended Sound Sources (SESS) for headphone reproduction for object sources that have an associated flag objectSourceHasExtent set to 1. The respective parameters for the object source are identified by objectSourceExtentId.

The synthesis is based on a description of a SESS by an (ideally) infinite number of decorrelated point sources distributed over the entire source extent spatial range. By continuously projecting the SESS geometry in the direction towards the current listener position, the range covered by said geometry can be identified every frame and updated in real-time. In other words, the geometry is projected onto a sphere representing the user's virtual listening space every frame. And the spatial sections occupied by the projected geometry on the sphere are the ones included in the auralization of the SESS.

A SESS is defined by the user in the Encoder Input Format (EIF). Given a desired source extent range, an SESS is synthesized using two decorrelated input signals. These input signals are processed in such a way, that perceptually important auditory cues are synthesized. This includes the following interaural cues: Interaural Cross Correlation (IACC), Interaural Phase Differences (IAPD) and Interaural Level Differences (IALD). Besides that, monaural spectral cues are reproduced. This is illustrated in FIG. 12.

Data Elements and Variables

| | |
|---|---|
| itemStore | a local pointer to the RenderItemStore object |
| B | block size |
| Fs | sampling rate |
| extentProcessors | map from item id to its extentProcessor instance |
| extentDownmixItem | RI to store the final output of all extent's binaural signal. |

Stage Description

To save real-time computational cost, individual HRTF points are assigned into pre-defined grid tables that separate the listener's virtual listening sphere into uniformly distributed regions. During the initialization, a N-point DFT is performed to get N/2+1 frequency components for each HRIR, where N is the length of it. Then, three intermediate values for each grid are obtained by integrating the data of all HRTF points within, which are the gains of the left and right channels, non-normalized IACC. In addition, the number of HRTF data points included in each grid is also stored. These are used to calculate the final cues in real-time.

The gains of both channels for each grid are calculated with equation 28 and 29, where $A_{l,n}$ and $A_{r,n}$ is the magnitude of the left and right HRTF respectively, N is the number of HRTF points that are within this grid:

$$G_l(\omega) = \sum_{n=1}^{N} A_{l,n}^2 \tag{28}$$

$$G_r(\omega) = \sum_{n=1}^{N} A_{r,n}^2 \tag{29}$$

The non-normalized IACC for each grid is calculated with equation 30, where ϕ, l and ϕ, r is the phase of left and right HRTF respectively:

$$IACC\ (\omega) = \sum_{n=1}^{N} A_{l,n}^2 A_{r,n}^2 \cdot e^{j(\phi_{l,n}-\phi_{r,n})} \tag{30}$$

Figure 8:
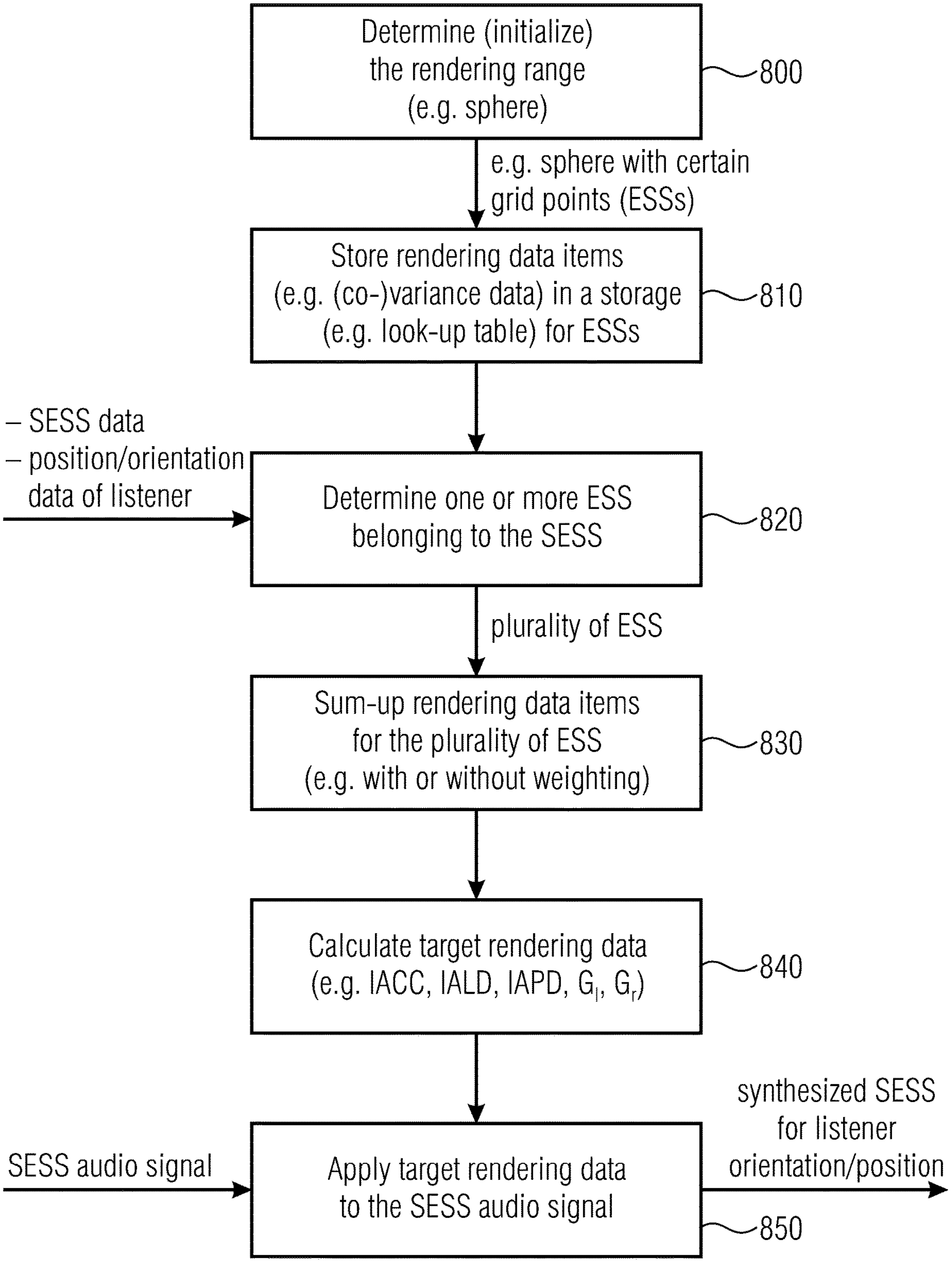
FIG. 8 illustrates a procedure for combining the three inventive aspects for the synthesis of spatially extended sound sources.

The procedures in equations 28 to 30 are performed before the actual processing in advance and correspond to steps 800, 810 of FIG. 8, and the results of these processings are the data advantageously stored in the storage 2000 or 200 in the corresponding figures.

During the real-time processing, each unique extended sound source is generated and managed by an Extent Processor. For every frame, each active processor receives a buffer of audio samples and the metadata indicating how to synthesize the extended sound source. Two separate processing chains exist: metadata handling in the update thread and audio processing in the audio thread. These are described respectively in the following sections, and their results are combined at the end of the second chain to produce binaural audio output.

Calculations Performed in the Update Thread

For each unique extended sound source, one or more metadata carriers, in the form of RIs (Rendering Items), are generated by the Occlusion Stage (e.g. corresponding to block 4000).

This stage 4000 loops through all the incoming RIs and assigns relevant extent metadata to the corresponding processor. If one of the spatial sections from the pre-defined table is covered and should be included for auralizing an Extent in this frame, the incoming metadata will contain a gain factor (items 4010, 4020, 4030 of FIG. 11) and a list of gains corresponding to some pre-defined frequency bins for it. By selecting (e.g. 4000), weighting (e.g. 5020) and eventually accumulating (e.g. 5040) the stored intermediate data with the gain and EQs, the generation of arbitrary shape of extended sound source with any form and degree of occlusion (size/material) is achieved.

The final filter is obtained by the following steps: After integrating (or accumulating) all grid points indicated in the RI (Rendering Item), the gain of the left and right channel and IACC (e.g. variance and covariance data) are normalized with the total weighted number of HRTF data points:

$$G_l(\omega) = \frac{\sum_{n=1}^{N} G_{grid,l,n}}{N_{weighted}} \tag{31}$$

$$G_r(\omega) = \frac{\sum_{n=1}^{N} G_{grid,r,n}}{N_{weighted}} \tag{32}$$

$$IACC\ (\omega) = \frac{\sum_{n=1}^{N} IACC_{grid,n}(\omega)}{N_{weighted}} \tag{33}$$

The procedures in equations 31 to 33 correspond to block 5040.

The frequency dependent $H_\alpha$ and $H_\beta$ are calculated using the normalized IACC:

$$H_\beta(\omega) = \sqrt{\frac{1}{2}\left(1 - \sqrt{1 - |IACC\ (\omega)|^2}\right)} \tag{34}$$

$$H_\alpha(\omega) = \sqrt{1 - H_\beta^2(\omega)} \tag{35}$$

The calculation in block 5060 corresponds to the processing of equations 34 and 35 in an embodiment.

The final stereo filters 3210, 3220, 3230, 3240 are obtained using $H_\alpha$ and $H_\beta$, gains of left and right channels ($G_l$ and $G_r$) and the phase extracted from the HRTF point corresponds to the center of the extent. ($phase_l$, and $phase_r$):

$$F_{1,l}(\omega) = H_\alpha(\omega) \cdot G_l(\omega) \cdot e^{j \cdot phase_l(\omega)} \tag{36}$$

$$F_{1,r}(\omega) = H_\beta(\omega) \cdot G_r(\omega) \cdot e^{j \cdot phase_r(\omega)} \tag{37}$$

$$F_{2,l}(\omega) = H_\beta(\omega) \cdot G_l(\omega) \cdot e^{j \cdot phase_l(\omega)} \tag{38}$$

-continued $$F_{2,r}(\omega) = H_\alpha(\omega)\cdot G_r(\omega)\cdot e^{j\cdot phase_r(\omega)} \quad (39)$$

The calculations of blocks 36 to 39 may be also performed in block 5060.

Calculations performed in the Audio Thread

The input mono signal is first fed into the decorrelator 3100 to obtain two decorrelated versions. The MPEG-I decorrelator or any other decorrelator such as the one illustrated in FIG. 10 can be used.

Then, each of the two decorrelated signals are convolved with the corresponding stereo filters 3210, 3220, 3230, 3240 calculated in the update thread, which results in four channels of output. Then, a cross mixing 3250, 3260 will be performed to produce the final binaural output.

Equations ( ) and (41) define the (filtering and) mixing process, where $S_1$ and $S_2$ stands for the two decorrelated signals, and $F_1$, and $F_2$, are the two stereo filters (for left and right, respectively) calculated in the metadata processing section. FIG. 13 is a signal flow diagram for the process. The filter illustrated in FIG. 13 is similar to the FIG. 9 filter.

$$S_l(\omega) = F_{1,l}(\omega)\cdot S_1(\omega) + F_{2,l}(\omega)\cdot S_2(\omega) \quad (40)$$

$$S_r(\omega) = F_{1,r}(\omega)\cdot S_1(\omega) + F_{2,r}(\omega)\cdot S_2(\omega) \quad (41)$$

The processing in accordance with equations 40 and 41 may be performed in the audio processor or Binaural Cue Synthesis block 3000 of FIG. 11 or 300 of FIGS. 4, 5, 6.

Figure 7:
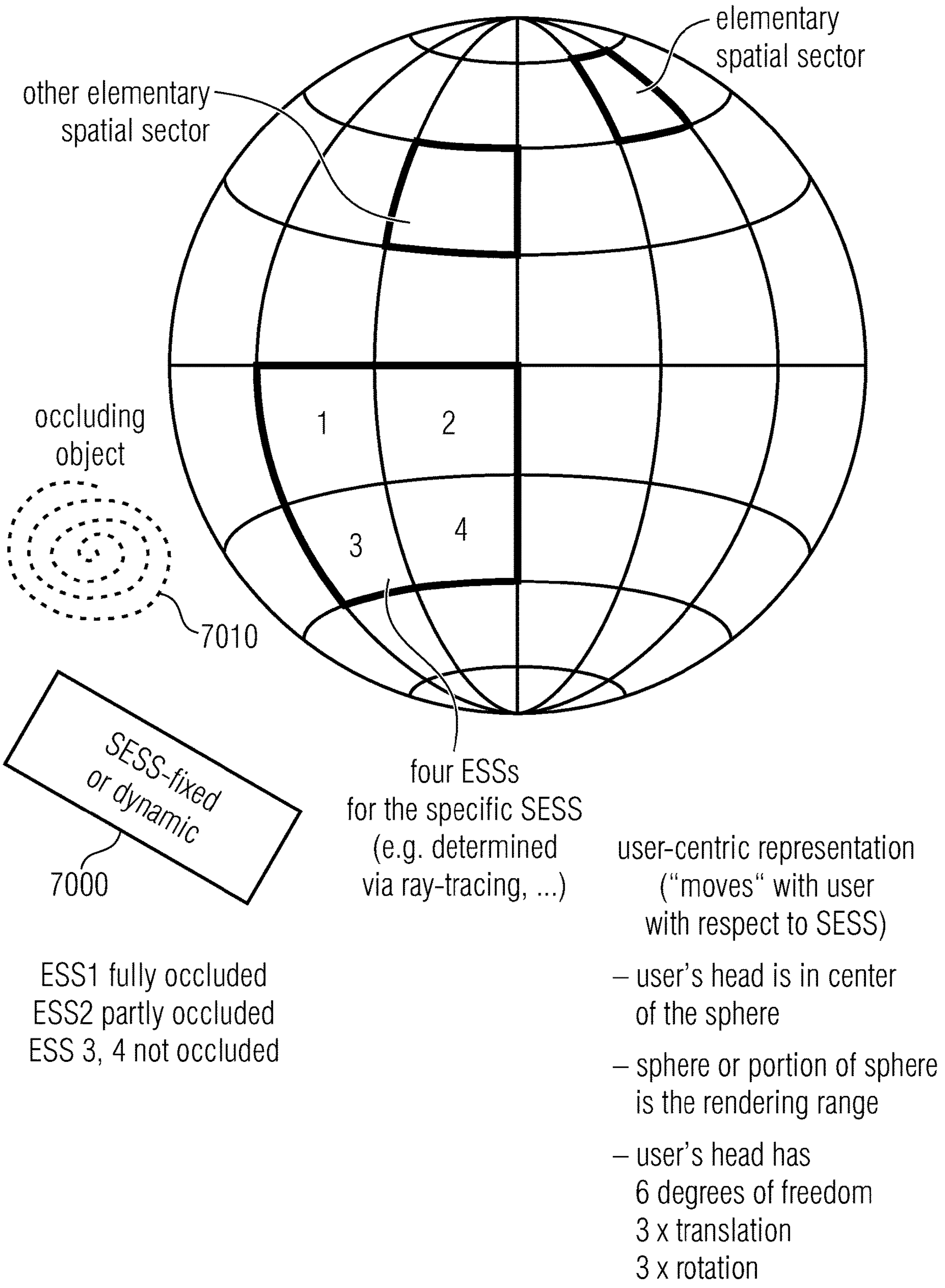
FIG. 7 illustrates an exemplary separation of the rendering range in elementary spatial sectors.

FIG. 7 illustrates a schematic representation of the rendering range for a listener. The rendering range is exemplarily a sphere that is centered around the user. Hence, the user or listener (not illustrated in FIG. 7) is located at the center of the sphere and the rendering range corresponding to this sphere around the listener can be considered to be "tied" to the user's hand. Hence, when the user changes her or his position in one of the horizontal, vertical, or depth direction (x, y, z), the sphere moves around in accordance with the user's movement with respect to the spatially extended sound source that can be considered to be fixed with respect to the user. Furthermore, when the user moves his hand by looking upwards, looking downwards, or looking to the side, the sphere representing the rendering range for the listener also moves upwards, downwards, or sidewards, i.e., also performs the "movement" that the user applies to her or his head without moving in the horizontal, vertical, or depth direction. Thus, the spherical rendering range for the listener can be considered to be a kind of a "helmet" always following the movement of the user's or listener's head in all 6 degrees of freedom.

This sphere is separated into individual elementary spatial sectors that can be spaced and, therefore, dimensioned differently with respect to the azimuth and elevation angle in order to reflect psychoacoustic findings. Particularly, the rendering range comprises the sphere or a portion of a sphere around the listener, and each elementary spatial sector illustrated in FIG. 7, for example, has an azimuth size and an elevation size. Particularly, the azimuth size and the elevation size of the elementary spatial sectors are different from each other, so that an azimuth size is finer for an elementary spatial sector directly in front of the listener, compared to an azimuth size of an elementary spatial sector more to the side of the listener, and/or the azimuth size decreases towards a side of the listener, and/or the elevation size of an elementary spatial sector is smaller than an azimuth size of this sector.

Hence, aspects of the invention rely on a user-centric representation that moves with the user with respect to the spatially extended sound source, and the user's head is in the center of the space and the sphere or a portion of the sphere is the rendering range.

The sector identification processor 4000 now determines, which different elementary spatial sectors represent the spatially extended sound source illustrated in FIG. 7 at 7000. In this example, it is, for example, determined via a ray tracing algorithm starting from the center of this sphere and pointing to the SESS 7000 that the four elementary spatial sectors ESSs indicated as "1", "2", "3", and "4" in FIG. 7 "belong" to the SESS 7000 at the specific orientation and position of the user with respect to the SESS 7000. Hence, it is assumed that the soundfield emitted by the SESS 7000 that actually reaches the ears of the user goes through these four ESSs. Furthermore, an occluding object 7010 is also illustrated in FIG. 7, and for the purpose of the example, it is assumed that elementary spatial sector (ESS 1) is fully occluded, elementary spatial sector 2 (ESS2) is partly occluded, and ESS3, 4 are not occluded by the occluding object.

Hence, turning to FIG. 11, elementary spatial sectors 1, 2 correspond to item 4010, elementary spatial sector 1 corresponds to item 4020 and elementary spatial sector 2 corresponds to item 4030 of FIG. 11. Alternatively, it could be determined that the partly occluded sector also belongs to the same class as the fully occluded sector or, if the sector is only occluded with a very small portion, then it can also be determined that a sector having an occlusion below a certain threshold is also determined to be not occluded at all.

Although it is illustrated in FIG. 7 that the elementary spatial sectors and the optional occluding degree of occluding or modification characteristic of the sectors are the same for both ears, i.e., for left and right, the case can also be that the number and/or identification of the elementary spatial sectors are different for the left and for the right ear. This can easily be the case, when an SESS is quite close to the user and the SESS is located more in the middle between both ears rather than on one side or the other.

Furthermore, other procedures than ray tracing algorithms can be performed in order to determine a projection of the SESS onto the rendering range for the listener, i.e., for the exemplary sphere. Additionally, the SESS 7000 need not necessarily be fixed. The SESS can also be dynamic, i.e., can move over time. Then, the SESS position with respect to the user has to be determined beforehand and, then, for a certain point in time/for a certain frame of the SESS waveform signal, the corresponding elementary spatial sectors for the left side and the right side of the listener for the actual position of the listener's head are determined and, then, the cues are calculated as illustrated with respect to logs 5020 to 5060 in FIG. 11.

Additionally, it is to be noted here that the rendering range does not necessarily have to be a full sphere. It can only comprise a portion of a sphere. Additionally, the rendering range does not necessarily have to be spherical. It can also be cylindrical or it can also have a shape of a polygon as long as it covers a certain three dimensional portion of the space around the listener.

Regarding the sizes of the elementary spatial sectors, it is to be emphasized that the elementary spatial sectors can be quite small that, for the determination of the stored rendering data items, only a single HRTF indicated with an amplitude and a phase instead of a summation over a certain number (as, for example, illustrated in equation 20, equation 21 and equation 22 or in equation 28 to 30 is sufficient). When, however, elementary spatial sectors are used that have a certain dimension, so that the size of the storage storing the rendering data items for each elementary spatial sector is reduced, the determination of the rendering data items stored in the storage for each elementary spatial sector can be performed in line with equations 20 to 22 or 28 to 30, where the HRTFs only belonging to a specific elementary spatial sector are summed-up in order to obtain the actual (co-) variance data for a certain frequency and for this elementary spatial sector.

It is to be noted that a specific advantage of this procedure is that all these calculations do not have to be performed at run-time. Instead, as soon as a certain division of the rendering range into a certain grid of elementary spatial sectors or grid points is determined, than the stored data for each individual or elementary spatial sector can be calculated and stored and, for a certain initialization with a certain grid, the only procedure done during run-time is to load the corresponding pre-calculated data for this grid into the storage or look-up table.

The only procedure that is necessary to be performed during run-time is the identification of the elementary spatial sectors belonging to the spatially extended sound source for the specific user orientation/position and the potentially necessary weighting due to occluding objects and then, the final overall summation corresponding to block 5040 in FIG. 11 which then gives the way free for the final target cue calculation in block 5060. Hence, the necessary calculation operations during run-time are very limited and are very small compared to the calculation operations used for determining the rending data items for the elementary spatial sectors, i.e., for the certain grid.

Furthermore, it is to be noted that the storage for the certain grid does not depend on the user position/orientation, since, in case of a change of the position or the characteristic of the SESS or in case of the change of the user's orientation/position, only the identified elementary spatial sectors change, but not the data stored for the elementary spatial sectors that represent the grid. In other words, only the ID numbers for the elementary spatial sectors change, but not the data for an elementary spatial sector having a certain ID number.

Subsequently, FIG. 8 is described in order to illustrate an advantageous procedure for one or several aspects of the invention.

In step 800, the rendering range such as the sphere is determined or initialized. The result is, for example, a sphere with certain grid points or elementary spatial sectors. In block 810, the rendering data items such as (co-) variance data is stored in a storage such as look-up table for all elementary spatial sectors in the rendering range.

Then, in step 820, the sector identification as done by block 4000 is performed. Hence, one or more elementary spatial sectors belonging to the spatially extended sound source is determined based on SESS data and position/orientation data of the listener input into block 820. The result of block 820 is one or more elementary spatial sectors.

In block 830, a summing-up of rendering data items for the plurality of elementary spatial sectors such as with or without weighting is performed as illustrated by block 5040.

In block 840, the target rendering data such as IACC, IALD, IAPD, GL, GR are calculated which is performed by block 5060.

In block 850, the target rendering data is applied to the spatially extended sound source audio signal as is illustrated, for example, also to by means of the audio processor block 3000 or binaural cue synthesis block 3000 of FIG. 11.

In accordance with the first aspect of the present invention, the rendering sphere is implemented as illustrated in FIG. 7, i.e., elementary spatial sectors covering a rendering range for a listener are determined and the sector identification processor defines a set of elementary spatial sectors such as two or more elementary spatial sectors for the spatially extended sound source. However, it is only an advantageous embodiment that the stored rendering data items are variance or co-variance data. Instead, other data items necessary for rendering can also be stored and combined by the target data calculator.

Furthermore, this procedure does also not necessarily require the modification processing, but advantageously performs the modification processing.

In accordance with the second aspect of the present invention, the determination of a potentially modifying object and the determination of a limited modified spatial sector based on the potentially modifying object identification is used. However, for this procedure, the rendering range does not necessarily have to be dimensioned as illustrated in FIG. 7, i.e., with individual elementary spatial sectors having individual stored data items. Instead, the rendering range could also be implemented as illustrated in other implementations such as the one illustrated in WO 2021/180935. Furthermore, for the determination and for the accounting for of modification objects, it is not necessarily the case that the stored rendering data items are variance/co-variance data. Instead, other rendering data such as illustrated to be stored data in WO 2021/180935 can be used as well.

Regarding the third aspect, the determination of the rendering range as illustrated in FIG. 7 is not necessarily required. Instead, other determination such as the definitions of the rendering range as illustrated in WO 2021/180935 can be used for the one or more limited spatial sector. However, the limited spatial sector may be implemented as an elementary spatial sector shown in FIG. 7. Furthermore, for the purpose of using variance/co-variance data as stored data, the specific processing with modifying/occluding objects is also not a required feature, but is of advantage as has been discussed before with respect to block 830 in FIG. 8, for example.

Further embodiments related to the first aspect are summarized subsequently.

Embodiments relate to an apparatus for synthesizing a spatially extended sound source (SESS), comprising: a storage for storing rendering data items for different elementary spatial sectors covering a rendering range for a listener; a sector identification processor for identifying, from the different elementary spatial sectors, a set of elementary spatial sectors belonging to the spatially extended sound source based on listener data and spatially extended sound source data; a target data calculator for calculating target rendering data from the rendering data items for the set of elementary spatial sectors; and an audio processor for processing an audio signal representing the spatially extended sound source using the target rendering data.

In further embodiments, the storage is configured to store, as the rendering data items, for each elementary spatial sector, at least one of a left variance data item related to left head related transfer function data, a right variance data item related to right head related transfer function (HRTF) data, and a covariance data item related to the left HRTF data and the right HRTF data, wherein the target calculator is configured to sum up the left variance data items for the set of elementary spatial sectors or the right variance data items for the set of elementary spatial sectors, or the covariance data items for the set of elementary spatial sectors, respectively, to obtain at least one summed up item, wherein the target calculator is configured to calculate at least one rendering cue as the target rendering data from the at least one summed up item, and wherein the audio processor is configured to process the audio signal using the at least one rendering cue.

In further embodiments, the sector identification processor is configured to apply a projection algorithm or a ray tracing analysis to determine the set of elementary spatial sectors, or to use, as the listener data, a listener position or a listener orientation, or to use, as the spatially extended sound source (SESS) data, an SESS orientation, an SESS position, or information on a geometry of the SESS.

In further embodiments, the sector identification processor is configured to receive, from a description of an audio scene, occluding information on a potentially occluding object, and to determine, based on the occlusion information, a specific spatial sector of the set of elementary spatial sectors as an occluding sector, and wherein the target data calculator is configured to apply an occlusion function to the rendering data items stored for the occluding sector to obtain modified data, and to use the modified data for calculating the target rendering data.

In further embodiments, the occlusion function is a low pass function having different attenuation values for different frequencies, and wherein the rendering data items are data items for different frequencies, and wherein the target data calculator is configured to weight, for several frequencies, a data item for a certain frequency with the attenuation value for the certain frequency to obtain the modified rendering data.

In further embodiments, the sector identification processor is configured to determine that another elementary spatial sector of the set of elementary spatial sectors determined for the occluding object is not occluded by the potential occluding object, and wherein the target data calculator is configured to combine the modified data from the occluding sector and the rendering data items of the other sector without a modification using the occluding function or modified by a different modification function to obtain the target rendering data.

In further embodiments, the sector identification processor is configured to determine a first elementary spatial sector of the set of elementary spatial sectors to have a first characteristic and to determine a second elementary spatial sector of the set of elementary spatial sectors to have a second different characteristic, and wherein the target data calculator is configured to not apply any modification function to the first elementary spatial sector and to apply a modification function to the second elementary spatial sector, or to apply a first modification function to the first elementary spatial sector and to apply a second modification function to the second elementary spatial sector, the second modification function being different from the first modification function.

In further embodiments, the first modification function is frequency selective and the second modification function is constant over frequency, or wherein the first modification function has a first frequency selective characteristic and wherein the second modification function has a second frequency selective characteristic being different from the first frequency selective characteristic, or wherein the first modification function has a first attenuation characteristic and the second modification function has a second different attenuation characteristic, and wherein the target data calculator is configured to select or adjust the modification function from the first modification function and the second modification function based on a distance between the first elementary spatial sector or the second elementary spatial sector to the listener or based on a characteristic of an object being placed between the listener and the corresponding elementary spatial sector.

In further embodiments, the sector identification processor is configured to classify the set of elementary spatial sectors into different sector classes based on characteristics associated with the elementary spatial sectors, wherein the target data calculator is configured to combine the rendering data items of the elementary spatial sectors in each class to obtain a combined result for each class, if more than one elementary spatial sectors is in a class, and to apply a specific modification function associated with at least one class to the combined result of this class to obtain a modified combination result for this class, or to apply the specific modification function associated with at least one class to the one or more data items of the one or more elementary spatial sectors of each class to obtain modified data items and to combine the modified data items of the elementary spatial sectors in each class to obtain a modified combination result for this class, to combine the combination result or if available the modified combination result for each class to obtain an overall combination result, and to use the overall combination result as the target rendering data or to calculate the target rendering data from the overall combination result.

In further embodiments, the characteristic for an elementary spatial sector is determined as being one of a group comprising an occluded elementary spatial sector involving a first occlusion characteristic, an occluded elementary spatial sector involving a second occlusion characteristic being different from the first occlusion characteristic, an unoccluded elementary spatial sector having a first distance to the listener, and an unoccluded elementary spatial sector having a second distance to the listener, wherein the second distance is different from the first distance.

In further embodiments, the target data calculator is configured to modify or combine frequency dependent variance or covariance parameters as the rendering data items to obtain, as the overall combination result, an overall combined variance or an overall combined covariance parameter, and to calculate at least one of an inter-aural coherence cue, an inter-aural level difference cue, an inter-aural phase difference cue, a first side gain, or a second side gain as the target rendering data.

In further embodiments, the audio processor is configured to perform at least one of an inter-channel coherence adjustment, an inter-channel phase difference adjustment, an inter-channel level difference adjustment using corresponding cues as the target rendering data.

In further embodiments, the rendering range comprises a sphere or a portion of a sphere around the listener, wherein the rendering range is tied to the listener position or listener orientation, and wherein each elementary spatial sector has an azimuth size and an elevation size.

In further embodiments, the azimuth size and the elevation size of the elementary spatial sectors are different from each other, so that an azimuth size is finer for an elementary spatial sector directly in front of the listener compared to an azimuth size of an elementary spatial sector more to the side of the listener, or wherein the azimuth size decreases towards a side of the listener, or wherein an elevation size of an elementary spatial sector is smaller than an azimuth size of this sector.

Further embodiments related to the second aspect are summarized subsequently.

An embodiment for an apparatus for synthesizing a spatially extended sound source, comprises: an input interface for receiving a description of an audio scene, the description of the audio scene comprising spatially extended sound source data on the spatially extended sound source and modification data on a potentially modifying object, and for receiving a listener data; a sector identification processor for identifying a limited modified spatial sector for the spatially extended sound source within a rendering range for the listener, the rendering range for the listener being larger than the limited modified spatial sector, based on the spatially extended sound source data and the listener data and the modification data; a target data calculator for calculating target rendering data from the one or more rendering data items belonging to the modified limited spatial sector; and an audio processor for processing an audio signal representing the spatially extended sound source using the target rendering data.

In further embodiments, the modification data is occlusion data, and wherein the potentially modifying object is a potentially occluding object.

In further embodiments, the potentially modifying object has an associated modification function, wherein the one or more rendering data items are frequency dependent, wherein the modification function is frequency selective, and wherein the target data calculator is configured to apply the frequency selective modification function to the one or more frequency dependent rendering data items.

In further embodiments, the frequency selective modification function has different values for different frequencies, and wherein the frequency dependent one or more rendering data items have different values for different frequencies, and wherein the target data calculator is configured to apply or multiply or combine a value of the frequency selective modification function for a certain frequency to a value of the one or more rendering data items for the certain frequency.

In further embodiments, a storage for storing the one or more rendering data items for a number of different limited spatial sectors is provided, wherein the number of different limited spatial sectors together form the rendering range for the listener.

In further embodiments, the modification function is a frequency selective low-pass function, and wherein the target data calculator is configured to apply the low-pass function so that a value of the one or more rendering data items at a higher frequency is attenuated stronger than a value of the one or more rendering data items at a lower frequency.

In further embodiments, the sector identification processor is configured to determine the limited spatial sector for the spatially extended sound source based on the listener data and the spatially extended sound source data, to determine, whether at least a part of the limited spatial sector is subject to a modification by the modifying object, and to determine the limited spatial sector as a modified spatial sector, when the part is greater than a threshold or when the whole limited spatial sector is subject to the modification by the modifying object.

In further embodiments, the sector identification processor is configured to apply a projection algorithm or a ray tracing analysis to determine the limited spatial sector, or to use, as the listener data, a listener position or a listener orientation, or to use, as the spatially extended sound source (SESS) data, an SESS orientation, an SESS position, or information on a geometry of the SESS.

In further embodiments, the rendering range comprises a sphere or a portion of a sphere around the listener, wherein the rendering range is tied to the listener position or listener orientation, and wherein the modified limited spatial sector has an azimuth size and an elevation size.

In further embodiments, the azimuth size and the elevation size of the modified limited spatial sector are different from each other, so that an azimuth size is finer for a modified limited spatial sector directly in front of the listener compared to an azimuth size of the modified limited spatial sector more to the side of the listener, or wherein the azimuth size decreases towards a side of the listener, or wherein an elevation size of the modified limited spatial sector is smaller than an azimuth size of the modified limited spatial sector.

In further embodiments, as the one or more rendering data items, for the modified limited spatial sector, at least one of a left variance data item related to a left head related transfer function data, a right variance data item related to a right head related transfer function (HRTF) data, and a covariance data item related to the left HRTF data and the right HRTF data is used.

In further embodiments, the sector identification processor is configured to determine a set of elementary spatial sectors belonging to the spatially extended sound source and to determine, among the set of elementary spatial sectors, one or more elementary spatial sectors as the limited modified spatial sector, and wherein the target data calculator is configured to modify the one or more rendering data items associated with the limited modified spatial sector using the modification data to obtain combined data, and to combine the combined data with rendering data items of one or more elementary spatial sectors of the set of elementary spatial sectors being different from the limited modified spatial sector and being not modified or modified in a different way compared to the modification for the limited modified spatial sector.

In further embodiments, the sector identification processor is configured to classify the set of elementary spatial sectors into different sector classes based on characteristics associated with the elementary spatial sectors, wherein the target data calculator is configured to combine the rendering data items of the elementary spatial sectors in each class to obtain a combined result for each class, if more than one elementary spatial sectors is in a class, and to apply a specific modification function associated with at least one class to the combined result of this class to obtain a modified combination result for this class, or to apply the specific modification function associated with at least one class to the one or more data items of the one or more elementary spatial sectors of each class to obtain modified data items and to combine the modified data items of the elementary spatial sectors in each class to obtain a modified combination result for this class, to combine the combination result or if available the modified combination result for each class to obtain an overall combination result, and to use the overall combination result as the target rendering data or to calculate the target rendering data from the overall combination result.

In further embodiments, the characteristic for an elementary spatial sector is determined as being one of a group comprising an occluded elementary spatial sector involving a first occlusion characteristic, an occluded elementary spatial sector involving a second occlusion characteristic being different from the first occlusion characteristic, an unoccluded elementary spatial sector having a first distance to the listener, and an unoccluded elementary spatial sector having a second distance to the listener, wherein the second distance is different from the first distance.

In further embodiments, the target data calculator is configured to modify or combine frequency dependent variance or covariance parameters as the rendering data items to obtain, as the overall combination result, an overall combined variance or an overall combined covariance parameter, and to calculate at least one of an inter-aural or inter-channel coherence cue, an inter-aural or inter-channel level difference cue, an inter-aural or inter-channel phase difference cue, a first side gain, or a second side gain as the target rendering data, and wherein the audio processor is configured for processing the audio signal using at least one of the inter-aural or inter-channel coherence cue, the inter-aural or inter-channel level difference cue, the inter-aural or inter-channel phase difference cue, a first side gain, or a second side gain as the target rendering data.

Further embodiments comprise an audio scene generator for generating an audio scene description, comprising: a spatially extending sound source (SESS) data generator for generating SESS data of the spatially extended sound source. a modification data generator for generating modification data on a potentially modifying object; and an output interface for generating the audio scene description comprising the SESS data and the modification data.

In further embodiments, the modification data comprises a description of a low pass function or geometry data on the potentially modifying object, wherein the low pass function comprises an attenuation value for a higher frequency, the attenuation value for the higher frequency representing an attenuation value being stronger compared to an attenuation value for a lower frequency, and wherein the output interface is configured to introduce the description of the attenuation function or the geometry data on the potentially modifying object as the modification data into the audio scene description.

In further embodiments, the SESS data generator is configured to generate, as the SESS data, a location of the SESS, and information on a geometry of the SESS, and wherein the output interface is configured to introduce, as the SESS data, the information on the location of the SESS and the information on the geometry of the SESS.

In further embodiments, the SESS data generator is configured to generate, as the SESS data, an information on a size, on a position, or on an orientation of the spatially extended sound source, or waveform data for one or more audio signals associated with the spatially extended sound source, or wherein the modification data calculator is configured to calculate, as the modification data, a geometry of a potentially modifying object such as a potentially occluding object.

Further embodiments comprise an audio scene description, comprising: spatially extended sound source data, and modification data on one or more potentially modifying objects.

In further embodiments, the audio scene description is implemented as a transmitted or stored bitstream, wherein the spatially extended sound source data represents a first bitstream element, and wherein the modification data represents a second bitstream element.

Further embodiments related to the third aspect are summarized subsequently.

An embodiment comprises an apparatus for synthesizing a spatially extended sound source (SESS), comprising: a storage for storing one or more rendering data items for different limited spatial sectors, wherein the different limited spatial sectors are located in a rendering range for a listener, wherein the one or more rendering data items for a limited spatial sector comprises at least one of a left variance data item related to left head related function data, a right variance data item related to right head related function data, and a covariance data item related to the left head related function data and the right head related function data; a sector identification processor for identifying one or more limited spatial sectors for the spatially extended sound source within the rendering range for the listener based on spatially extended sound source data; a target data calculator for calculating target rendering data from the stored left variance data, the stored right variance data, or the stored covariance data; and an audio processor for processing an audio signal representing the spatially extended sound source using the target rendering data.

In further embodiments, the storage is configured to store the variance data items or the covariance data item related to head related transfer function data, or binaural room impulse response data, or binaural room transfer function data, or head related impulse response data.

In further embodiments, the one or more rendering data items comprise variance or covariance data item values for different frequencies.

In further embodiments, the storage is configured to store, for each limited spatial sector, a frequency dependent representation of the left variance data item, a frequency dependent representation of the right variance data item, and a frequency dependent representation of the covariance data item.

In further embodiments, the target data calculator is configured for calculating, as the target rendering data, at least one of an inter-aural or inter-channel coherence cue, an inter-aural or inter-channel level difference cue, an inter-aural or inter-channel phase difference cue, a first side gain, and a second side gain as the target rendering data, and wherein the audio processor is configured to perform at least one of an inter-channel or inter-aural coherence adjustment, an inter-aural or inter-channel phase difference adjustment, or an inter-aural or inter-channel level difference adjustment using corresponding cues as the target rendering data.

In further embodiments, the target data calculator is configured to calculate the inter-aural or inter-channel coherence cue based on the left variance data item, the right variance data item and the covariance data item, or to calculate the inter-channel or inter aural phase difference cue based on the left variance data item, and the right variance data item, or to calculate the inter-channel or inter-aural phase difference cue based on the covariance data item, or to calculate the left or right side gain using the left or right variance data item and an information related to a signal power of the audio signal.

In further embodiments, the target data calculator is configured to calculate the inter-aural or inter-channel coherence cue, so that a value of the inter-aural or inter-channel coherence cue is within a range of +/−20% of a value obtained by an equation for the inter-aural or inter-channel coherence cue described in the specification, or wherein the target data calculator is configured to calculate the inter-aural or inter-channel level difference cue so that a value of the inter-aural or inter-channel level difference cue is within a range of +/−20% of a value obtained by an equation for the inter-aural or inter-channel level difference cue described in the specification, or wherein the target data calculator is configured to calculate the inter-aural or inter-channel phase difference cue so that a value of the inter-aural or inter-channel phase difference cue is within a range of +/−20% of a value obtained by an equation for the inter-aural or inter-channel phase difference cue described in the specification, or wherein the target data calculator is configured to calculate the first or the second side gain so that a value of the first or the second side gain is within a range of +/−20% of a value obtained by an equation for the left or right side gain described in the specification.

In further embodiments, the sector identification processor is configured to apply a projection algorithm or a ray tracing analysis to determine the one or more limited spatial sectors as a set of elementary spatial sectors, or to use, as the listener data, a listener position or a listener orientation, or to use, as the spatially extended sound source (SESS) data, an SESS orientation, an SESS position, or information on a geometry of the SESS.

In further embodiments, the rendering range comprises a sphere or a portion of a sphere around the listener, wherein the rendering range is tied to the listener position or the listener orientation, and wherein the one or more limited spatial sector has an azimuth size and an elevation size.

In further embodiments, the azimuth size and the elevation size of the different limited spatial sectors are different from each other, so that an azimuth size is finer for a limited spatial sector directly in front of the listener compared to an azimuth size of a limited spatial sector more to the side of the listener, or wherein the azimuth size decreases towards a side of the listener, or wherein an elevation size of a limited spatial sector is smaller than an azimuth size of this sector.

In further embodiments, the sector identification processor is configured to determine a set of elementary spatial sectors as the one or more limited spatial sectors, wherein, for each elementary spatial sector, at least one of the left variance data item, the right variance data item, and the covariance data item is stored.

In further embodiments, the sector identification processor is configured to receive, from a description of an audio scene, occluding information on a potentially occluding object, and to determine, based on the occlusion information, a specific spatial sector of the set of elementary spatial sectors as an occluding sector, and wherein the target data calculator is configured to apply an occlusion function to the rendering data items stored for the occluding sector to obtain modified data, and to use the modified data for calculating the target rendering data.

In further embodiments, the occlusion function is a low pass function having different attenuation values for different frequencies, and wherein the rendering data items are data items for different frequencies, and wherein the target data calculator is configured to weight, for several frequencies, a data item for a certain frequency with the attenuation value for the certain frequency to obtain the modified rendering data.

In further embodiments, the sector identification processor is configured to determine that another elementary spatial sector of the set of elementary spatial sectors determined for the occluding object is not occluded by the potential occluding object, and wherein the target data calculator is configured to combine the modified data from the occluding sector and the rendering data items of the other sector without a modification using the occluding function or modified by a different modification function to obtain the target rendering data.

In further embodiments, the sector identification processor is configured to determine a first elementary spatial sector of the set of elementary spatial sectors to have a first characteristic and to determine a second elementary spatial sector of the set of elementary spatial sectors to have a second different characteristic, and wherein the target data calculator is configured to not apply any modification function to the first elementary spatial sector and to apply a modification function to the second elementary spatial sector, or to apply a first modification function to the first elementary spatial sector and to apply a second modification function to the second elementary spatial sector, the second modification function being different from the first modification function.

In further embodiments, the first modification function is frequency selective and the second modification function is constant over frequency, or wherein the first modification function has a first frequency selective characteristic and wherein the second modification function has a second frequency selective characteristic being different from the first frequency selective characteristic, or wherein the first modification function has a first attenuation characteristic and the second modification function has a second different attenuation characteristic, and wherein the target data calculator is configured to select or adjust the modification function from the first modification function and the second modification function based on a distance between the first elementary spatial sector or the second elementary spatial sector to the listener or based on a characteristic of an object being placed between the listener and the corresponding elementary spatial sector.

In further embodiments, the sector identification processor is configured to classify the set of elementary spatial sectors into different sector classes based on characteristics associated with the elementary spatial sectors, wherein the target data calculator is configured to combine the rendering data items of the elementary spatial sectors in each class to obtain a combined result for each class, if more than one elementary spatial sectors is in a class, and to apply a specific modification function associated with at least one class to the combined result of this class to obtain a modified combination result for this class, or to apply the specific modification function associated with at least one class to the one or more data items of the one or more elementary spatial sectors of each class to obtain modified data items and to combine the modified data items of the elementary spatial sectors in each class to obtain a modified combination result for this class, to combine the combination result or if available the modified combination result for each class to obtain an overall combination result, and to use the overall combination result as the target rendering data or to calculate the target rendering data from the overall combination result.

In further embodiments, the characteristic for an elementary spatial sector is determined as being one of a group comprising an occluded elementary spatial sector involving a first occlusion characteristic, an occluded elementary spatial sector involving a second occlusion characteristic being different from the first occlusion characteristic, an unoccluded elementary spatial sector having a first distance to the listener, and an unoccluded elementary spatial sector having a second distance to the listener, wherein the second distance is different from the first distance.

In further embodiments, the target data calculator is configured to modify or combine frequency dependent variance or covariance parameters as the rendering data items to obtain, as the overall combination result, an overall combined variance or an overall combined covariance parameter, and to calculate at least one of an inter-aural or inter-channel coherence cue, an inter-aural or inter-channel level difference cue, an inter-aural or inter-channel phase difference cue, a first side gain, or a second side gain as the target rendering data.

In further embodiments, an initializer is provided to determine at least one of the left variance data item, the right variance data item, and the covariance data item from pre-stored head related function data, wherein the initializer is configured to calculate the left variance data item, the right variance data item or the covariance data item from a plurality of head related function data for the limited spatial sector, and wherein the limited spatial sector is sized in such a way that at least two left head related function data, at least two right head related function data exist for the limited spatial range.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

BIBLIOGRAPHY \I 1031 Alary, B., Politis, A., & VälimÄki, V. (2017). Velvet Noise Decorrelator.

Baumgarte, F., & Faller, C. (2003). Binaural Cue Coding-Part I: Psychoacoustic Fundamentals and Design Principles. Speech and Audio Processing, IEEE Transactions on, 11(6), S. 509-519.

Blauert, J. (2001). Spatial hearing (3 Ausg.). Cambridge; Mass: MIT Press.

Faller, C., & Baumgarte, F. (2003). Binaural Cue Coding-Part II: Schemes and Applications. Speech and Audio Processing, IEEE Transactions on, 11(6), S. 520-531.

Kendall, G. S. (1995). The Decorrelation of Audio Signals and Its Impact on Spatial Imagery. Computer Music Journal, 19(4), S. p 71-87.

Lauridsen, H. (1954). Experiments Concerning Different Kinds of Room-Acoustics Recording. Ingenioren, 47.

Pihlajamäki, T., Santala, O., & Pulkki, V. (2014). Synthesis of Spatially Extended Virtual Source with Time-Frequency Decomposition of Mono Signals. Journal of the Audio Engineering Society, 62(7/8), S. 467-484.

Potard, G. (2003). A study on sound source apparent shape and wideness.

Potard, G., & Burnett, I. (2004). Decorrelation Techniques for the Rendering of Apparent Sound Source Width in 3D Audio Displays.

Pulkki, V. (1997). Virtual Sound Source Positioning Using Vector Base Amplitude Panning. Journal of the Audio Engineering Society, 45(6), S. 456-466.

Pulkki, V. (1999). Uniform spreading of amplitude panned virtual sources.

Pulkki, V. (2007). Spatial Sound Reproduction with Directional Audio Coding. J. Audio Eng. Soc, 55(6), S. 503-516.

Pulkki, V., Laitinen, M.-V., & Erkut, C. (2009). Efficient Spatial Sound Synthesis for Virtual Worlds.

Schlecht, S. J., Alary, B., Välimäki, V., & Habets, E. A. (2018). Optimized Velvet-Noise Decorrelator.

Schmele, T., & Sayin, U. (2018). Controlling the Apparent Source Size in Ambisonics Unisng Decorrelation Filters.

Schmidt, J., & Schröder, E. F. (2004). New and Advanced Features for Audio Presentation in the MPEG-4 Standard.

Verron, C., Aramaki, M., Kronland-Martinet, R., & Pallone, G. (2010). A 3-D Immersive Synthesizer for Environmental Sounds. Audio, Speech, and Language Processing, IEEE Transactions on, title=A Backward-Compatible Multichannel Audio Codec, 18(6), S. 1550-1561.

Zotter, F., & Frank, M. (2013). Efficient Phantom Source Widening. Archives of Acoustics, 38(1), S. 27-37.

Zotter, F., Frank, M., Kronlachner, M., & Choi, J.-W. (2014). Efficient Phantom Source Widening and Diffuseness in Ambisonics.

The invention claimed is:

1. An apparatus for synthesizing a spatially extended sound source (SESS), comprising:

a storage for storing rendering data items for different elementary spatial sectors covering a rendering range for a listener the rendering data items comprising, for each elementary spatial sector, at least one of a left variance data item related to left head related transfer function data, a right variance data item related to right head related transfer function (HRTF) data, and a covariance data item related to the left HRTF data and the right HRTF data;

a sector identification processor for identifying, from the different elementary spatial sectors, a set of elementary spatial sectors belonging to the spatially extended sound source based on listener data and spatially extended sound source data, wherein the set of elementary spatial sectors comprises two or more elementary spatial sectors from the different elementary spatial sectors;

a target data calculator for calculating target rendering data using a combination of the rendering data items for the set of elementary spatial sectors, wherein the target data calculator is configured to sum up the left variance data items for the set of elementary spatial sectors, or the right variance data items for the set of elementary spatial sectors, or the covariance data items for the set of elementary spatial sectors, respectively, to acquire at least one summed up item, and to calculate at least one rendering cue as the target rendering data from the at least one summed up item; and an audio processor for processing an audio signal representing the spatially extended sound source using the at least one rendering cue representing the target rendering data.

2. The apparatus of claim 1, wherein the sector identification processor is configured to apply a projection algorithm or a ray tracing analysis to determine the set of elementary spatial sectors, or to use, as the listener data, a listener position or a listener orientation, or to use, as the spatially extended sound source (SESS) data, an SESS orientation, an SESS position, or information on a geometry of the SESS.

3. The apparatus of claim 1, wherein the sector identification processor is configured to receive, from a description of an audio scene, occluding information on a potentially occluding object, and to determine, based on the occlusion information, a specific spatial sector of the set of elementary spatial sectors as an occluding sector, and wherein the target data calculator is configured to apply an occlusion function to the rendering data items stored for the occluding sector to acquire modified data, and to use the modified data for calculating the target rendering data.

4. The apparatus of claim 3, wherein the occlusion function is a low pass function comprising different attenuation values for different frequencies, and wherein the rendering data items are data items for different frequencies, and wherein the target data calculator is configured to weight, for several frequencies, a data item for a certain frequency with the attenuation value for the certain frequency to acquire the modified rendering data.

5. The apparatus of claim 3, wherein the sector identification processor is configured to determine that another elementary spatial sector of the set of elementary spatial sectors determined for the occluding object is not occluded by the potential occluding object, and wherein the target data calculator is configured to combine the modified data from the occluding sector and the rendering data items of the other sector without a modification using the occluding function or modified by a different modification function to acquire the target rendering data.

6. The apparatus of claim 1, wherein the sector identification processor is configured to determine a first elementary spatial sector of the set of elementary spatial sectors to comprise a first characteristic and to determine a second elementary spatial sector of the set of elementary spatial sectors to comprise a second different characteristic, and wherein the target data calculator is configured to not apply any modification function to the first elementary spatial sector and to apply a modification function to the second elementary spatial sector, or to apply a first modification function to the first elementary spatial sector and to apply a second modification function to the second elementary spatial sector, the second modification function being different from the first modification function.

7. The apparatus of claim 6,

Wherein the first modification function is frequency selective and the second modification function is constant over frequency, or wherein the first modification function comprises a first frequency selective characteristic and wherein the second modification function comprises a second frequency selective characteristic being different from the first frequency selective characteristic, or wherein the first modification function comprises a first attenuation characteristic and the second modification function comprises a second different attenuation characteristic, and wherein the target data calculator is configured to select or adjust the modification function from the first modification function and the second modification function based on a distance between the first elementary spatial sector or the second elementary spatial sector to the listener or based on a characteristic of an object being placed between the listener and the corresponding elementary spatial sector.

8. The apparatus of claim 1, wherein the audio processor is configured to perform at least one of an inter-channel coherence adjustment, an inter-channel phase difference adjustment, an inter-channel level difference adjustment using corresponding cues as the target rendering data.

9. The apparatus of claim 1, wherein the rendering range comprises a sphere or a portion of a sphere around the listener, wherein the rendering range is tied to the listener position or listener orientation, and wherein each elementary spatial sector comprises an azimuth size and an elevation size.

10. The apparatus of claim 9, wherein the azimuth size and the elevation size of the elementary spatial sectors are different from each other, so that an azimuth size is finer for an elementary spatial sector directly in front of the listener compared to an azimuth size of an elementary spatial sector more to the side of the listener, or wherein the azimuth size decreases towards a side of the listener, or wherein an elevation size of an elementary spatial sector is smaller than an azimuth size of this sector.

11. An apparatus for synthesizing a spatially extended sound source (SESS), comprising:

a storage for storing rendering data items for different elementary spatial sectors covering a rendering range for a listener;

a sector identification processor for identifying, from the different elementary spatial sectors, a set of elementary spatial sectors belonging to the spatially extended sound source based on listener data and spatially extended sound source data, wherein the set of elementary spatial sectors comprises two or more elementary spatial sectors from the different elementary spatial sectors;

a target data calculator for calculating target rendering data using a combination of the rendering data items for the set of elementary spatial sectors; and an audio processor for processing an audio signal representing the spatially extended sound source using the target rendering data, wherein the sector identification processor is configured to classify the set of elementary spatial sectors into different sector classes based on characteristics associated with the elementary spatial sectors, wherein the target data calculator is configured to combine the rendering data items of the elementary spatial sectors in each class to acquire a combined result for each class, if more than one elementary spatial sectors is in a class, and to apply a specific modification function associated with at least one class to the combined result of this class to acquire a modified combination result for this class, or to apply a specific modification function associated with at least one class to the one or more data items of the one or more elementary spatial sectors of the at least one class to acquire modified data items and to combine the modified data items of the elementary spatial sectors in the at least one class to acquire a modified combination result for this class, to combine the combination result or if available the modified combination result for each class to acquire an overall combination result, and to use the overall combination result as the target rendering data or to calculate the target rendering data from the overall combination result.

12. The apparatus of claim 11, wherein the characteristic for an elementary spatial sector is determined as being one of a group comprising an occluded elementary spatial sector involving a first occlusion characteristic, an occluded elementary spatial sector involving a second occlusion characteristic being different from the first occlusion characteristic, an unoccluded elementary spatial sector comprising a first distance to the listener, and an unoccluded elementary spatial sector comprising a second distance to the listener, wherein the second distance is different from the first distance.

13. The apparatus of claim 11, wherein the target data calculator is configured to modify or combine frequency dependent variance or covariance parameters as the rendering data items to acquire, as the overall combination result, an overall combined variance or an overall combined covariance parameter, and to calculate at least one of an inter-aural coherence cue, an inter-aural level difference cue, an inter-aural phase difference cue, a first side gain, or a second side gain as the target rendering data.

14. A method of synthesizing a spatially extended sound source (SESS), comprising:

storing rendering data items for different elementary spatial sectors covering a rendering range for a listener;

identifying, from the different elementary spatial sectors, a set of elementary spatial sectors belonging to the spatially extended sound source based on listener data and spatially extended sound source data, wherein the set of elementary spatial sectors comprises two or more elementary spatial sectors from the different elementary spatial sectors;

calculating target rendering data using a combination of the rendering data items for the set of elementary spatial sectors; and processing an audio signal representing the spatially extended sound source using the target rendering data, wherein, as the rendering data items, for each elementary spatial sector, at least one of a left variance data item related to left head related transfer function data, a right variance data item related to right head related transfer function (HRTF) data, and a covariance data item related to the left HRTF data and the right HRTF data is stored, wherein the calculating comprise summing up the left variance data items for the set of elementary spatial sectors or the right variance data items for the set of elementary spatial sectors, or the covariance data items for the set of elementary spatial sectors, respectively, to acquire at least one summed up item, and calculating at least one rendering cue as the target rendering data from the at least one summed up item, and wherein the processing comprises processing the audio signal using the at least one rendering cue, or wherein the identifying comprises classifying the set of elementary spatial sectors into different sector classes based on characteristics associated with the elementary spatial sectors, wherein the calculating comprises combining the rendering data items of the elementary spatial sectors in each class to acquire a combined result for each class, if more than one elementary spatial sectors is in a class, and applying a specific modification function associated with at least one class to the combined result of this class to acquire a modified combination result for this class, or applying a specific modification function associated with at least one class to the one or more data items of the one or more elementary spatial sectors of the at least one class to acquire modified data items and combining the modified data items of the elementary spatial sectors in the at least one class to acquire a modified combination result for this class, combining the combination result or if available the modified combination result for each class to acquire an overall combination result, and using the overall combination result as the target rendering data or calculating the target rendering data from the overall combination result.

15. A non-transitory digital storage medium having a computer program stored thereon to perform, when the computer program is run by a computer, a method for synthesizing a spatially extended sound source (SESS), the method comprising:

storing rendering data items for different elementary spatial sectors covering a rendering range for a listener;

identifying, from the different elementary spatial sectors, a set of elementary spatial sectors belonging to the spatially extended sound source based on listener data and spatially extended sound source data, wherein the set of elementary spatial sectors comprises two or more elementary spatial sectors from the different elementary spatial sectors;

calculating target rendering data using a combination of the rendering data items for the set of elementary spatial sectors; and processing an audio signal representing the spatially extended sound source using the target rendering data, wherein, as the rendering data items, for each elementary spatial sector, at least one of a left variance data item related to left head related transfer function data, a right variance data item related to right head related transfer function (HRTF) data, and a covariance data item related to the left HRTF data and the right HRTF data is stored, wherein the calculating comprise summing up the left variance data items for the set of elementary spatial sectors or the right variance data items for the set of elementary spatial sectors, or the covariance data items for the set of elementary spatial sectors, respectively, to acquire at least one summed up item, and calculating at least one rendering cue as the target rendering data from the at least one summed up item, and wherein the processing comprises processing the audio signal using the at least one rendering cue, or wherein the identifying comprises classifying the set of elementary spatial sectors into different sector classes based on characteristics associated with the elementary spatial sectors, wherein the calculating comprises combining the rendering data items of the elementary spatial sectors in each class to acquire a combined result for each class, if more than one elementary spatial sectors is in a class, and applying a specific modification function associated with at least one class to the combined result of this class to acquire a modified combination result for this class, or applying a specific modification function associated with at least one class to the one or more data items of the one or more elementary spatial sectors of the at least one class to acquire modified data items and combining the modified data items of the elementary spatial sectors in the at least one class to acquire a modified combination result for this class, combining the combination result or if available the modified combination result for each class to acquire an overall combination result, and using the overall combination result as the target rendering data or calculating the target rendering data from the overall combination result.

* * * * *